TELETYPEWRITER CODE CONTROLLED SELECTIVE DEVICE

Filed Oct. 10, 1952 8 Sheets-Sheet 1

INVENTOR
J. T. NEISWINTER
BY R. C. Terry
ATTORNEY

Jan. 1, 1957 J. T. NEISWINTER 2,776,333
TELETYPEWRITER CODE CONTROLLED SELECTIVE DEVICE
Filed Oct. 10, 1952 8 Sheets-Sheet 2

INVENTOR
J. T. NEISWINTER
BY R. C. Perry
ATTORNEY

Jan. 1, 1957 J. T. NEISWINTER 2,776,333

TELETYPEWRITER CODE CONTROLLED SELECTIVE DEVICE

Filed Oct. 10, 1952 8 Sheets-Sheet 3

PULSE CIRCUIT

INVENTOR
J. T. NEISWINTER
BY R. C. Lerry
ATTORNEY

TELETYPEWRITER CODE CONTROLLED SELECTIVE DEVICE

SELECTING CIRCUIT

INVENTOR
J. T. NEISWINTER
BY R. C. Terry
ATTORNEY

TELETYPEWRITER CODE CONTROLLED SELECTIVE DEVICE

Filed Oct. 10, 1952 8 Sheets-Sheet 5

SELECTING CIRCUIT

INVENTOR
J. T. NEISWINTER
BY R. C. Levy
ATTORNEY

ACTIVATE CIRCUIT

INVENTOR
J. T. NEISWINTER
BY R. C. Terry
ATTORNEY

RELAY CODE CCT.

INVENTOR
J. T. NEISWINTER
BY R. C. Terry
ATTORNEY

TELETYPEWRITER CODE CONTROLLED SELECTIVE DEVICE

Filed Oct. 10, 1952 8 Sheets-Sheet 8

OUTPUT AND SUBSCRIBER RELAY CIRCUIT

INVENTOR
J. T. NEISWINTER
BY R. C. Terry
ATTORNEY 2,776,333

TELETYPEWRITER CODE CONTROLLED SELECTIVE DEVICE

James T. Neiswinter, Garden City, N. Y., assignor to American Telephone and Telegraph Company, a corporation of New York Application October 10, 1952, Serial No. 314,146

16 Claims. (Cl. 178—2)

This invention relates to printing telegraph apparatus and more particularly to permutation code controlled selecting devices which automatically direct a message from a station of origin to a station of destination through one or more switching centers in accordance with and under the control of directing, or address, characters in code signal combinations preceding each message.

In an automatic teletypewriter switching system which is to be found in the prior art, reference, for example, being made herein to the copending patent application of Bacon-Knandel-Krecek-Locke, Serial No. 119,184, filed October 1, 1949, which matured into Patent 2,766,318 granted October 9, 1956, for such a system, a plurality of character code signals, each comprising at least two, are employed as the address, or directing, codes, each pair designating a particular one of the main stations or a teletypewriter at any one of the main stations of the system. These directing codes are employed for controlling automatic switching apparatus located at a switching center to select, for transmission of a message, an outgoing line or trunk depending on whether the desired station is connected to a line outgoing from that switching center, or is connected to a line outgoing from a remote switching center reached by a trunk, or by trunks incoming to and outgoing from one or more intermediate switching centers. In accordance with that prior art disclosure the station to which the message is directed, or addressed, may be one of a plurality of stations associated with a multistation line, sometimes called a party line, such line having associated with it a subordinate switching selector for causing the message to be recorded at the particular station addressed. A purpose of the system shown in W. M. Bacon et al. patent, supra, is to eliminate all geographical or regional restriction as to assignment of address codes so that with a system comprising one or more switching centers each serving a plurality of telegraph stations, any station anywhere in the system may have assigned as its address code any two of the character codes available for use as address codes. To accomplish those objects relating to selecting desired lines and stations in the system disclosed in the W. M. Bacon et al. patent, supra, a mechanical selector equipped with means capable of responding to the characters of one or more address permutation codes is provided. This type of selector is therefore a switching device arranged to operate under the control of permutation code signals.

A mechanical selector employed in the prior art is identified as a sequentially operated teletypewriter universal selector, or what is generally known as a "SOTUS" unit, and it serves to connect and disconnect one or more receiving and sending teletypewriters on a line circuit under the control of certain teletypewriter character combinations transmitted on the circuit. A SOTUS unit is located at each station, is always connected to the circuit and surveys all traffic passing over the circuit. When the SOTUS unit is in a normal, or "deactivated," condition, it will respond only to signal code combinations for "Figures H" which activates the SOTUS unit in preparation for connecting to the line circuit one or more receiving machines or a signal code combination for a "Blank" followed by a fraction of a second pause for connecting to the line circuit a sending machine. The reception of a "Figures H" signal by the SOTUS unit places the SOTUS unit in an "activated" condition and in this condition the SOTUS unit is arranged to respond to one or more two-character signal code combinations for the address, or directing, codes as AB, CD, EF, GK, and so forth, which will connect the respectively corresponding receiving machines. After one or more receiving machines have been connected to a circuit in response to the corresponding two-character signal code combinations the SOTUS unit may be deactivated in response to a "carriage return" or "line feed" signal code combination, so that character signal code combinations in the text of a following message, which might be the same as those in the address codes of which the SOTUS unit will operate, will not cause a false selective operation. At the end of a message the "Figures H" signal is sent to activate the particular SOTUS unit that has made a selection, and all other SOTUS units on the line, so that the address code preceding another message can be transmitted on the line to connect another desired receiving machine. The reception of a "Figures H" signal in a SOTUS unit also disconnects any machine or machines that were previously connected. The reception of a "Blank" signal followed by a fraction of a second pause, places the SOTUS unit in a condition to receive a "Space" signal followed by a single character signal, which will connect a sending machine to the transmitting path of a full duplex circuit with which the SOTUS unit is associated.

A fundamental object of the present invention is to employ electronic means for effecting the necessary switching to select individually or in groups two or more teletypewriters or stations connected to a line circuit, in response to two or more permutation code signal combinations received in predetermined order.

Another object is to accomplish by means of an electronic selector the same results that are obtained by a mechanical selector in an automatic teletypewriter switching system as disclosed in the prior art.

According to the present invention an electronic SOTUS unit is provided for recognizing teletypewriter character signals by a purely electronic means to effect the desired switching operation in an automatic switching teletypewriter intercommunicating system. The present invention has been disclosed as an instrumentality for connecting and disconnecting receiving teletypewriters, but it will be understood that the invention as disclosed herein could readily be adapted for connecting and disconnecting sending teletypwriter machines to a transmitting path, and for numerous other switching purposes. The electronic SOTUS unit comprises (1) means for obtaining selecting pulses Nos. 1 to 5 and a sixth pulse, the sixth pulse being referred to hereinafter as pulse No. 6 to differentiate from the "stop" pulse of the character signal incoming from the line; (2) means for recognizing the "Figures" signal combination entirely with electronic tubes so that no mechanical action of any sort takes place on the reception of signals during the deactivated condition of the SOTUS unit; (3) means for causing the reception of "Figures" and "H" signal combinations to release a relay to activate the SOTUS unit and, after the SOTUS unit is activated, for causing the reception of the "carriage return" signal to deactivate the SOTUS unit; and (4) means for recognizing two-character signal codes when the SOTUS unit is activated and, as an example of a use to which the SOTUS unit may be put, for causing the recognition of such codes to connect one or more desired receiving teletypewriters to the line circuit. The satisfactory operation of the electronic SOTUS unit requires impulses of a type that may be generated by a counting circuit such as may be found in an automatic message accounting system or an electronic regenerative repeater such as disclosed in B. Ostendorf, Jr. patent application, Serial No. 77,169, filed February 18, 1949. Herein, the Ostendorf repeater is employed to regenerate signaling impulses incoming over a line circuit and these regenerated impulses together with impulses produced in the counting circuit of the repeater are impressed on a selection circuit of the SOTUS unit to cause to operate therein, in turn, an activate circuit, an address code relay circuit and an output and customer's relay circuit, the latter circuit serving to connect the desired customer's station or a particular teletypewriter at such station to an incoming line circuit for the purpose of receiving a message. The disclosure of the Ostendorf application is therefore incorporated herein, by reference, as part of the present specification.

A more complete understanding of the invention will be had from the following description considered in conjunction with the accompanying drawings, in which:

Fig. 1 shows a layout of a multiparty line circuit wherein three teletypewriters are shown connected to a line circuit. The purpose of including the layout is to show how messages that would ordinarily be lost because of their respective address codes being mutilated during transmission, are recorded at one station of the system and then retransmitted to their respectively proper stations, their proper destinations being determined from the nature and substance of such messages as recorded at such one station;

Figs. 2 and 3 show in skeleton form, the all-electronic regenerative repeater circuit disclosed in the copending application of B. Ostendorf, Jr., supra, only those parts of the repeater circuit being shown that are necessary to explain the origin of the signaling impulses used in the operation of the electronic SOTUS unit, Fig. 2 showing also the transmission networks responsive to the regenerated signal impulses and impulses produced in the counting circuit of the repeater for respectively producing the selecting pulses required to operate the selection circuit of the SOTUS unit;

Figures 1, 9:
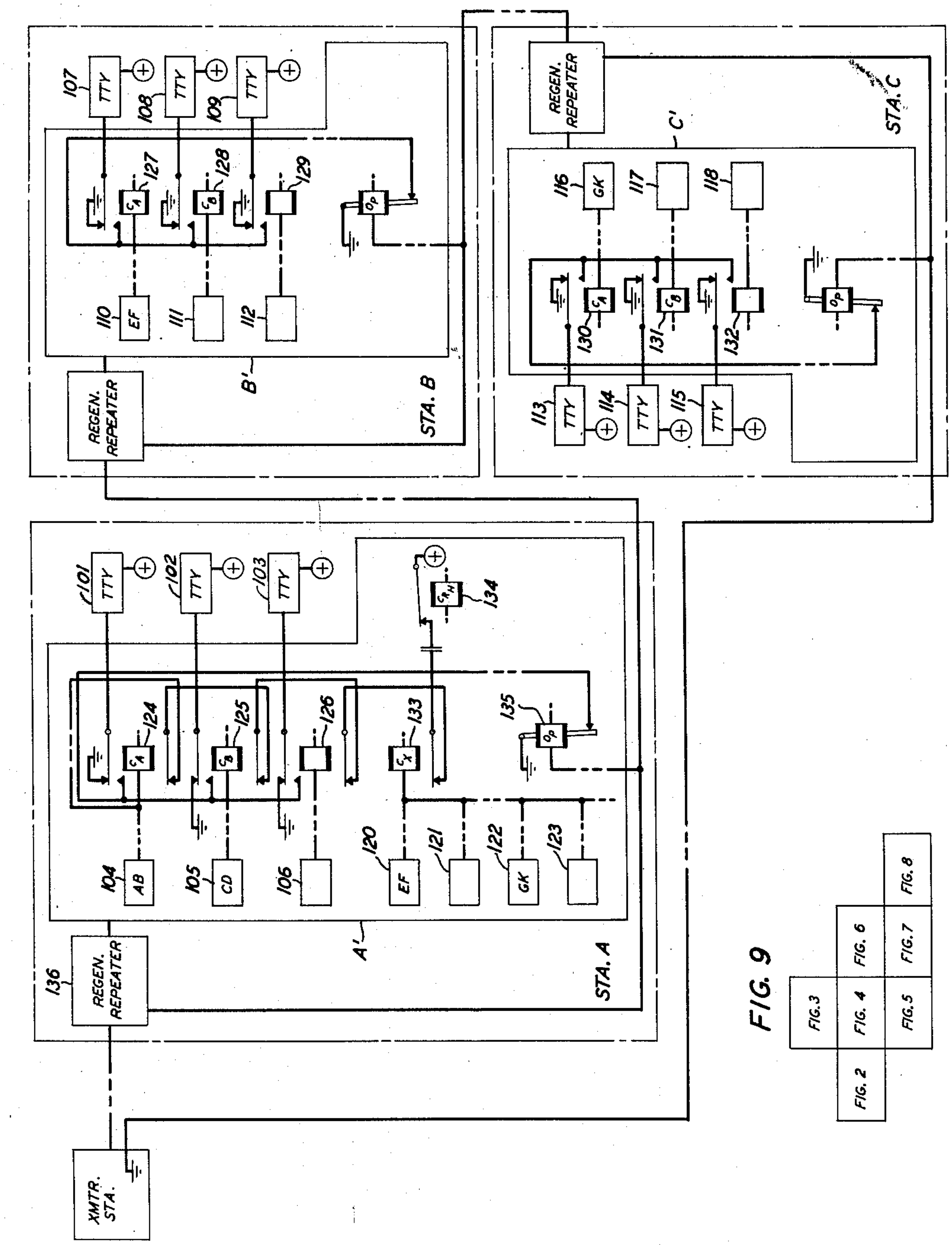
Figure 7:
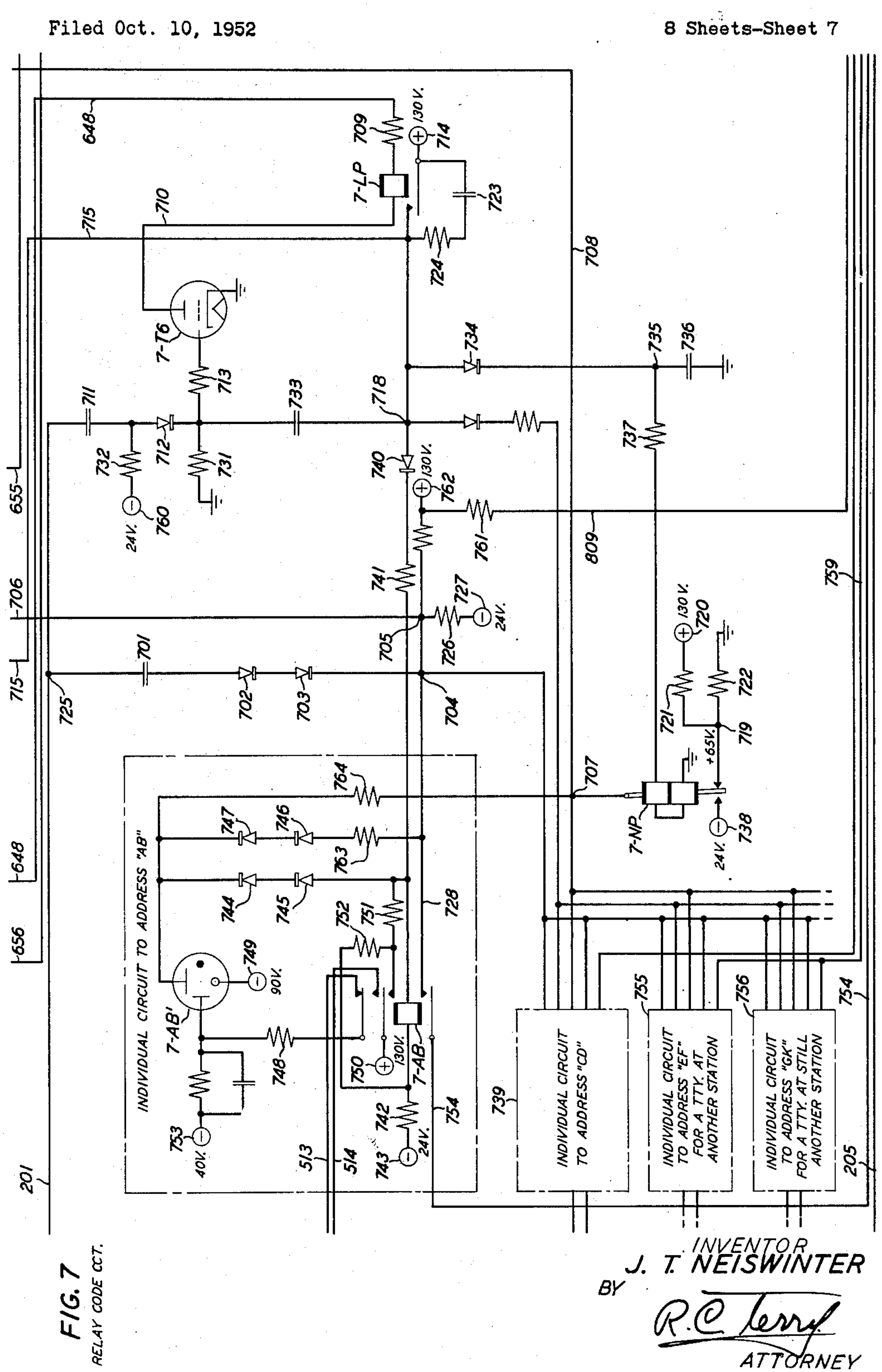
Figure 8:
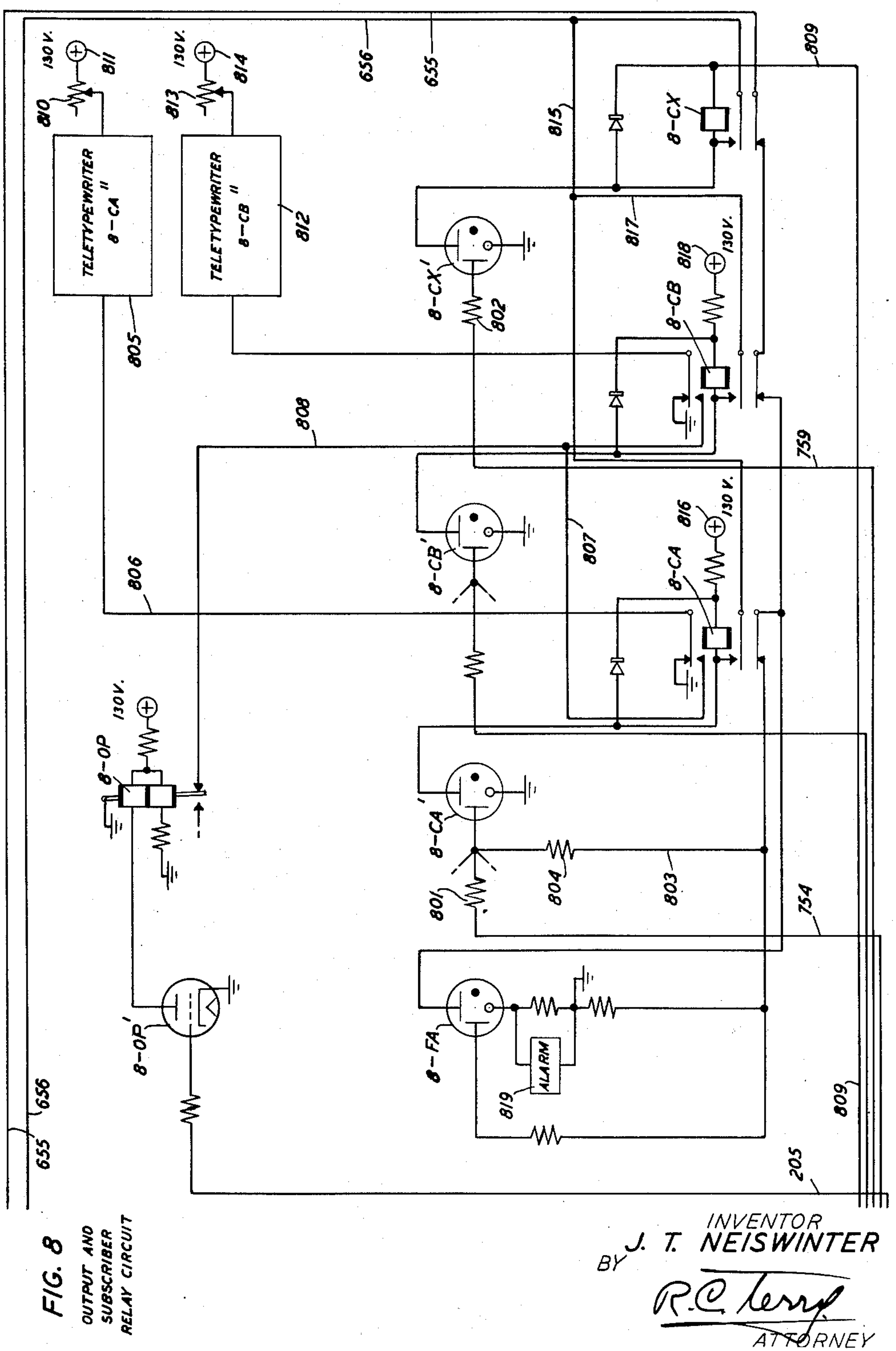

Figs. 7 and 8 respectively show the address code relay circuits and the output and subscriber relay circuit, the former circuit being responsive to the address codes for selecting through the latter circuit the teletypewriter or teletypewriters desired for connection to the line circuit; and Fig. 9 shows the relative arrangement of Figs. 2 to 8.

*General description*

Figure 2:
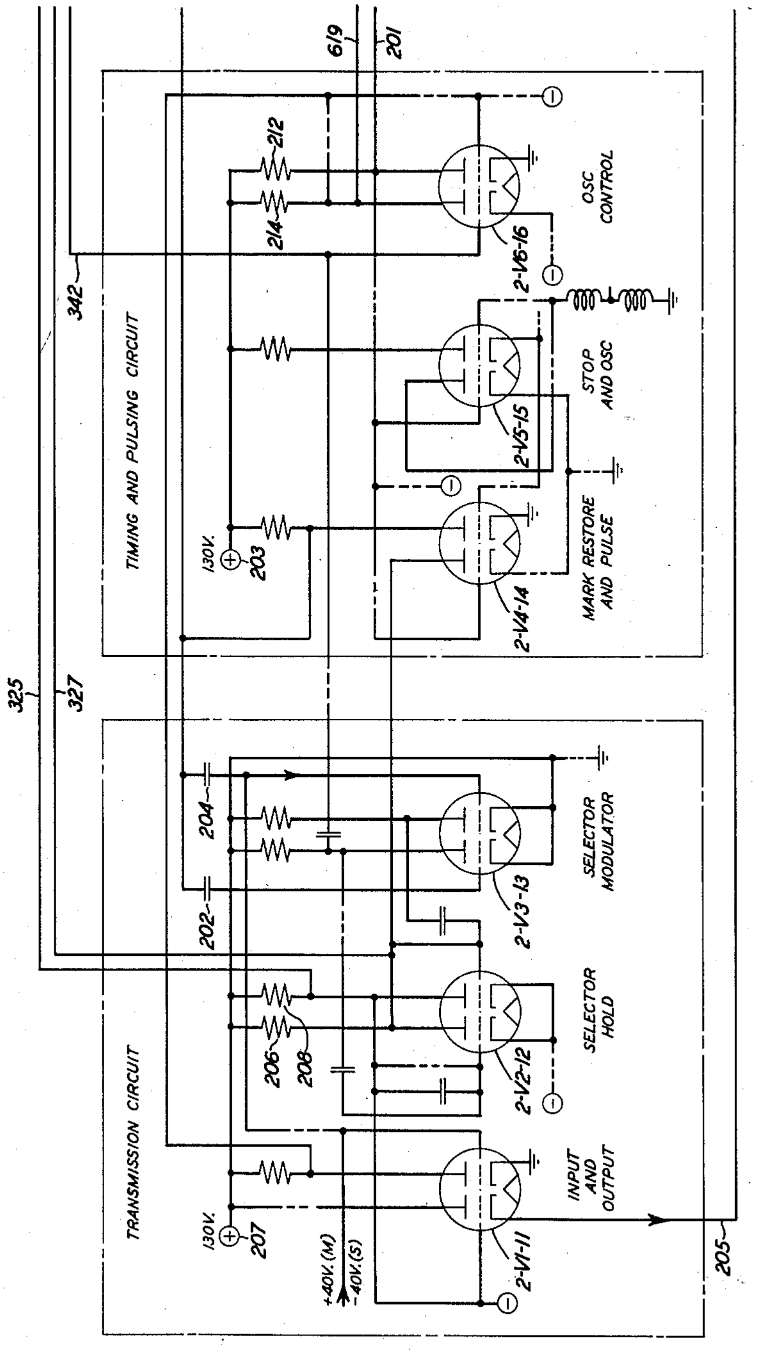

The use of reference characters on the drawings follows a definite plan. In Figs. 1 to 8, inclusive, all apparatus shown have reference characters consisting of numerals and letters, the numerals shown are prefixes corresponding to the number of the figure in which the apparatus are located. Certain apparatus is copied from the all-electonic regenerative repeater disclosed in the copending application of B. Ostendorf, Jr., supra, and such apparatus in Figs. 2 and 3 has in addition to the numerical prefixes and letters other numerals which are shown as suffixes corresponding to the numerals shown on the drawings in the Ostendorf application. All other parts of the system are designated by numerals only, for instance, those parts of Fig. 1 are designated with the numerals between 100 and 199, those in Fig. 2 are designated with numerals between 200 and 299, and so forth, wherein the first, or hundreds, digit designates the figure in which the particular part is located.

*A description of the Ostendorf electronic regenerative repeater*

The regenerative repeater comprises nine vacuum tubes identified by the reference numerals 2–V1–11, 2–V2–12, 2–V3–13, 2–V4–14, 2–V5–15, 2–V6–16, 3–V7–17, 3–V8–18 and 3–V9–19, and each of these vacuum tubes has left- and right-hand triode sections. Tubes 2–V1–V11, 2–V2–12 and 2–V3–13 represent the transmission circuit of the repeater, tubes 2–V4–14, 2–V5–15 and 2–V6–16 represent the timing and pulsing circuit, and tubes 3–V7–17, 3–V8–18 and 3–V9–19 represent the counting circuit. These tubes perform the following functions and in the idle condition of the repeater the triodes of each may be in a conductive or non-conductive condition as indicated below.

(1) The input, or right-hand, triode of tube 2–V1–11 receives incoming signals and is normally conductive, it being conductive on marking. The output, or left-hand, triode serves to transmit outgoing signals and is normally conductive, it also being conductive on marking.

(2) The tube 2–V2–12 is a selector-hold tube and its right-hand triode controls the grid of the output triode of tube 2–V1–11, the right-hand triode becoming conductive for the retransmission of a spacing impulse thereby cutting off the output triode of tube 2–V1–11. The two triodes of tube 2–V2–12 are arranged for flip-flop operation, the left-hand triode being cut off when the right-hand triode becomes conductive. The left-hand triode of tube 2–V2–12, when conductive, cuts off the right-hand triode to restore marking signal transmission. In the idle condition the left-hand triode is conductive and the right-hand triode is cut off, or non-conductive. Tube 2–V2–12 remains in the condition to which it was last operated, during the entire signal element and until an element of different sign is received; in other words, it holds its selection for the duration of a signal pulse.

(3) Tube 2–V3–13 is a selector-modulator tube and is arranged to control selector-hold tube 2–V2–12. It serves to combine the input signals and the positive voltage peaks received from the oscillator and pulse circuits. This tube also provides point selection in that its left-hand triode plate supplies a negative pulse to the left-hand triode grid of selector-hold tube 2–V2–12 and its right-hand triode plate supplies a negative pulse to the right-hand triode grid of tube 2–V2–12. The left-hand triode of tube 2–V3–13 produces the first count pulse (positive voltage). Its right-hand triode is held far beyond cut-off along with the input, or right-hand, triode of tube 2–V1–11 when a space impulse is being received, while its left-hand triode is not highly biased and is permitted to conduct in response to a timing pulse applied through a blocking condenser 202 by the right-hand triode of tube 2–V4–14. During a marking signal the left-hand triode of tube 2–V3–13 is held far beyond cut-off by the input anode of tube 2–V1–11, while the right-hand triode is not so highly biased and is permitted to conduct in response to a timing impulse. The plates of tube 2–V3–13 are resistance-capacity coupled to the corresponding grids of tube 2–V2–12. Either triode of tube 2–V3–13 conducts only momentarily and neither triode is conducting during the idle condition.

(4) Tube 2–V4–14 has functions described as pulsing and mark restoring. The right-hand triode receives high positive and negative sine wave voltages from the cathode of the right-hand triode of tube 2–V5–15 and thus becomes highly overloaded, it saturates or cuts off sharply, thereby having a substantially square-topped wave output which is applied through blocking condensers 202 and 204 to the grids of tube 2–V3–13 as timing pulses used in signal selection. The right-hand triode of tube 2–V4–14 is normally conducting. The left-hand triode conducts in unison with the left-hand triode of tube 2–V5–15 and has a common load resistor with the left-hand triode of tube 2–V2–12 to assure that in the stop, or rest, condition the right-hand triode of tube 2–V2–12 is cut off and as a result a marking condition is transmitted. The left-hand triode of tube 2–V4–14 is normally conducting during idle periods.

(5) Tube 2–V5–15 comprises an oscillator and stop control therefor. The right-hand triode is the oscillator section and is normally non-oscillating. The left-hand triode is normally conductive and when conductive it holds the oscillator dormant.

(6) Tube 2–V6–16 functions to control the left-hand triode of the oscillator control tube 2–V5–15. The right-hand triode is normally cut off and becomes conductive under the control of the input triode of tube 2–V1–11 when that triode is cut off in response to the start impulse. The right-hand triode of tube 2–V6–16 upon becoming conducting, cuts off the left-hand triode of tubes 2–V4–14 and 2–V5–15, the latter serving to permit the oscillator to start oscillating. The left-hand triode of tube 2–V5–15 is normally conductive and cuts off under the control of the left-hand triode of tube 2–V3–13 to supply the initial pulse to the character timing or impulse counting circuit which comprises tubes 3–V7–17, 3–V8–18 and 3–V9–19.

Tubes 3–V7–17, 3–V8–18 and 3–V9–19 comprise three flip-flop circuits connected in cascade. The right-hand triode of each is normally conducting. When the left-hand triode of tube 2–V6–16 cuts off it applies a positive pulse to the grid of the left-hand triode of tube 3–V7–17 which activates or starts conducting the left-hand triode thereby cutting off the right-hand triode. A negative pulse resulting from activation of the left-hand triode of tube 3–V7–17 is applied to both grids of tube 3–V8–18, causing the right-hand triode to cut off as a result of which the left-hand triode becomes conductive. A negative pulse resulting from activation of the left-hand triode of tube 3–V8–18 similarly causes the right-hand triode of tube 3–V9–19 to cut off and the left-hand triode to become conductive. Each of the three tubes has just been reversed as a result of the initial pulse from tube 2–V6–16. Thereafter, uniformly spaced timing pulses are applied by the right-hand triode of tube 2–V4–14 to the grids of both triodes of tube 3–V7–17. Tube 3–V7–17 reverses on every negative timing impulse, tube 3–V8–18 reverses on every other negative timing impulse and tube 3–V9–19 reverses on every fourth negative impulse. Tube 3–V7–17 returns to its initial condition in response to the first, third, fifth and seventh of the timing pulses. Tube 3–V8–18 returns to its initial condition in response to the second and sixth of the timing impulses and tube 3–V9–19 returns to its initial condition in response to the fourth timing pulse. From this it follows that the normal, or idle, condition of the counting circuit is restored in response to the seventh timing pulse after the circuit was stepped off-normal. With the tubes 3–V7–17, 3–V8–18 and 3–V9–19 in normal condition the left-hand triode of tube 2–V6–16 is conditioned to become conductive and it becomes conductive, cutting off the right-hand triode of tube 2–V6–16 by grid control if that triode is concurrently conditioned for cutoff by reception of the "stop" impulse of the incoming signal which is of marking nature, by the input triode of tube 2–V1–11. If the right-hand triode of tube 2–V6–16 cuts off, as it should, it reactivates the left-hand triode of tube 2–V5–15 which stops the oscillator.

With reference to Fig. 1, three stations, namely, stations A, B and C are shown connected to the line circuit over which signals are received from a transmitter at a transmitting station. At each of stations A, B and C is provided a plurality of teletypewriters, each arranged to receive messages after a local electronic SOTUS unit, in response to the proper address code signals, has selected the teletypewriters to which the message is directed. A message may be directed to one or more teletypewriters respectively located at one or more different stations and when the desired teletypewriters are connected to the line circuit through their respective SOTUS units the message is transmitted simultaneously to such teletypewriters. At each station an electronic regenerative repeater such as disclosed in the copending application of B. Ostendorf, Jr., supra, is provided for controlling the selection of the teletypewriters located at that station. At station A are teletypewriters 101, 102 and 103 arranged to be respectively selected by the address code circuits represented by blocks 104, 105 and 106 which are included in SOTUS unit A'. At station B are teletypewriters 107, 108 and 109 arranged to be respectively selected by the address code circuits respectively represented by blocks 110, 111 and 112 which are included in SOTUS unit B'. At station C are teletypewriters 113, 114 and 115, arranged to be respectively selected by the address code circuits represented by blocks 116, 117 and 118 which are included in SOTUS unit C'. The selection of the teletypewriter is made through a cold cathode tube and the relay circuit, individual to the teletypewriter, as shown in Fig. 8. The cold cathode tube and the relay circuits at station A are represented by relays 124, 125 and 126 and serve to connect teletypewriters 101, 102 and 103, respectively, when selected, to their respective address code circuits 104, 105 and 106. At station B the corresponding circuits are represented by relays 127, 128 and 129 which serve to respectively connect when selected through their respective address code circuits 110, 111 and 112, teletypewriters 107, 108 and 109. At station C the corresponding circuits are represented by relays 130, 131 and 132 which serve to respectively connect when connected through their respective address code circuits 116, 117 and 118, teletypewriters 113, 114 and 115.

However, at one station only, in this case, station A, there is provided an additional address code circuit for each teletypewriter located at the other stations, such as stations B and C whereby any address code signal combination for any teletypewriter located at any one of these other stations, is also received by the corresponding address code circuit at station A. This provision is made to prevent the loss of a message intended for a teletypewriter at one of the other stations, should the address code for such a teletypewriter be mutilated or garbled during transmission. Accordingly, at station A are shown blocks 120 and 121 representing the address code circuits respectively corresponding to and in addition to the address code circuits located at station B, and blocks 122 and 123 representing the address code circuits respectively corresponding to and in addition to the address code circuits located at station C. Associated with the additional address code circuits at station A is a cold cathode tube and relay circuit represented by relay 133 which responds to each address code signal combination of signals intended for the teletypewriter at any of the other stations providing such combination is correct, the operation of the cold cathode tube and relay circuit 133 being an indication that there is no mutilation of the address signal combinations during transmission.

In the event that an address code signal combination for any teletypewriter at any of the stations A, B and C is mutilated, none of the cold cathode tube and relay circuits 124, 125, 126 and 133 at station A responds and a normally closed circuit remains closed. Immediately following the transmission of an address code signal combination the "carriage return" signal is transmitted to deactivate the SOTUS unit and in response to the "carriage return" signal relay 134 restores to its normally operated condition. If at this time the cold cathode tube and relay circuit 133 and the other cold cathode tube and relay circuits at that station are unoperated because of the address code signal being mutilated, the restoration of relay 134 to its normally operated condition causes a voltage pulse to be transmitted in a circuit extending over back contact and lower armature of each of cold cathode tube and relay circuits 133, 126, 125 and 124 to operate cold cathode tube and relay circuit 124 whereby the relay of circuit 124 operates and locks up in its operated condition. As hereinbefore stated, circuit 124 when operated connects teletypewriter 101 to the armature of repeater output relay 135 and relay 135 in response to the message signals incoming over the line circuit and repeated by regenerative repeater 136, repeats the message and it is recorded by teletypewriter 101. Therefore, a message that would ordinarily be lost due to a mutilation of its directing code signaling combination is recorded on teletypewriter 101 and from the message so recorded, its proper destination can, in most cases, be determined and then retransmitted to the proper stations.

Figure 3:
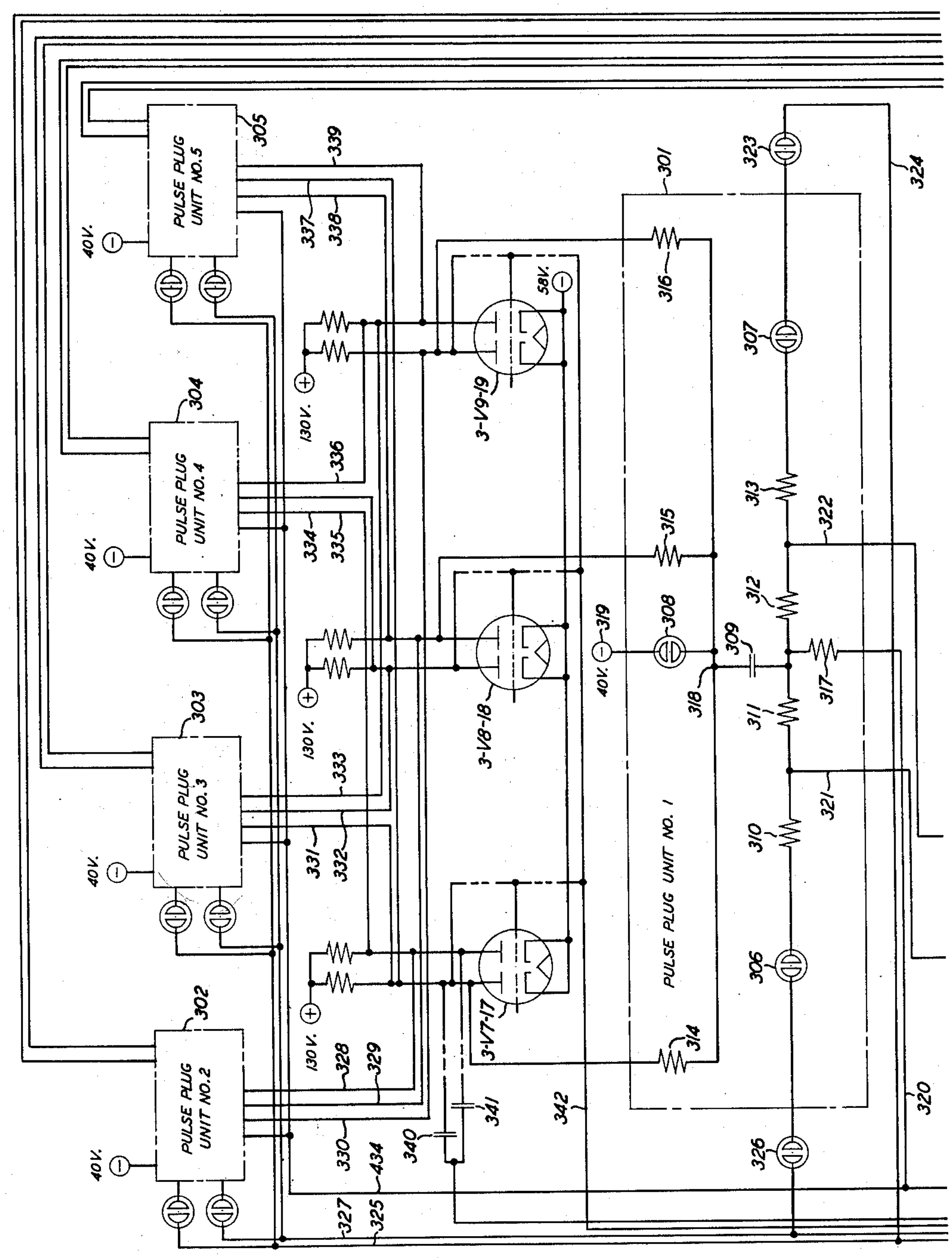

With reference to Figs. 2 and 3, the signals incoming from a line circuit are of positive and negative potentials, say of 40 volts, for both marking and spacing elements, respectively, and are applied to the grid of the input, or right-hand, triode of vacuum tube 2–V1–11 which corresponds to tube 11 in Fig. 1 on the drawings of the copending application of Ostendorf, supra. The marking signal elements pass through an additional resistor, say of 0.75 megohm, directly to the grid of right-hand triode of selector-modulator vacuum tube 2–V3–13 and a space-to-mark transition raises the grid potential from approximately negative potential of 40 volts to 0 volt. The right-hand triode of tube 2–V3–13 will remain non-conducting inasmuch as its cathode which is at a positive potential, say of approximately 14 volts, with respect to its grid. The potential at the grid of the right-hand triode of tube 2–V3–13 is held at zero voltage in this case due to the grid-cathode current flowing in the input triode of tube 2–V1–11 which is made to conduct by the incoming marking signal element. With the input triode of tube 2–V1–11 conducting, the potential at the plate of such triode will be lowered so as to cause the potential at the grid of the left-hand triode of tube 2–V3–13 to be lowered from zero voltage to a negative potential, say of approximately 40 volts. Thus, the incoming marking pulse causes a zero potential to be applied to the grid of the right-hand triode of tube 2–V3–13 and a negative potential, say of 40 volts, to the grid of the left-hand triode of the same tube and neither triode will be conducting. An incoming spacing signal element (negative) will serve to make the input triode of tube 2–V1–11 non-conducting and the potentials applied to the grids of tube 2–V3–13 will be interchanged. For an incoming spacing element, the grid of the right-hand triode of tube 2–V3–13 will be at a negative potential, say of 40 volts, and the grid of the left-hand triode of the same tube will be at zero potential.

Basic timing in the Ostendorf repeater is accomplished by a start-stop oscillator which starts without transients at the receipt of a start pulse of an incoming teletypewriter character signal and stops—also without transients—during the stop pulse. The oscillator continues to oscillate for the duration of each incoming teletypewriter character signal. The frequency of the oscillator is such that there is just one complete cycle for each of the seven elements of an incoming teletypewriter character signal and an electronic counting circuit counts the cycles and stops the oscillator at the end of the seventh element. The left- and right-hand triode in stop-oscillator vacuum tube 2–V5–15, together with a timing circuit, not shown, constitute the character timing oscillator, the right-hand triode which is of the cathode-follower type, serving to supply sufficient energy when the circuit is oscillating to maintain the output at a constant level and the left-hand triode serving to start and stop the oscillation. When the left-hand, or start-stop control, triode of tube 2–V5–15 is in conducting condition it forms a low impedance shunt across the oscillator circuit and prevents oscillation. The output of the right-hand triode of tube 2–V5–15, being a cathode-follower triode, is applied to the grid of the right-hand, or pulsing, triode of vacuum tube 2–V4–14. The pulsing triode being highly overloaded, saturates and cuts off sharply to produce an output in the form of a square-topped wave of the oscillator frequency. The plate of the right-hand triode of tube 2–V4–14 is connected to four small capacitors 202, 204, 340 and 341, the first pair being respectively connected to the two grids of tube 2–V3–13 and the second pair being respectively connected to the two plates of tube 3–V7–17, and provides four sources of positive and negative voltage pips, that is, sharp voltage peaks of short duration. Each of these narrow pips of voltage is obtained at each transition of the square-topped wave, the pips being in a positive, or upward, direction when the wave is increasing in value and in a negative, or downward, direction when the wave is decreasing. The positive pips occur at points respectively corresponding to the mid-points of the elements of an incoming signal and are impressed on a circuit that starts for each positive pip an outgoing element of the same sense, that is, marking or spacing, as its corresponding element in the incoming signal. In other words, each positive pip, in turn, will start an element of the signal, and the length of each element is actually one cycle of the timing oscillator. In this way, a new set of signal elements is sent out corresponding to those of the incoming signal, in their proper order and sense, but completely reformed and retimed, and starting just one-half element interval later than the beginning of the incoming signal. The pips resulting from the voltage wave passing through capacitors 202 and 204 which are respectively impressed on the grids of the left-hand and right-hand triodes of selector-modulator tube 2–V3–13 and are modulated there with the incoming signal elements. Therefore, the timing of the sharp voltage pips of the voltage wave is such that a positive pip occurs in the middle of each incoming signal element.

The voltages on both grids of selector-modulator of tube 2–V3–13 are made more positive by approximately 20 volts by the incidence of these positive pips caused by the square-topped wave passing through the capacitors 202 and 204 in the timing and pulsing circuit. When the grid of the right-hand triode of tube 2–V3–13 is raised to zero potential by a marking signal element, a pip from the timing and pulsing circuit raises the grid potential to a positive voltage of approximately 20 volts and the right-hand triode conducts momentarily. At the same time the voltage of the grid of the left-hand triode is negative with respect to its cathode and the left-hand triode remains non-conducting. Likewise, reception of a spacing signal element will bias the grid of the left-hand triode of tube 2–V3–13 to zero potential and the grid of the right-hand triode will assume a negative potential, say of 40 volts, with the result that the arrival of the positive pip will cause the left-hand triode to conduct momentarily and the right-hand triode to remain non-conducting.

It should be noted that the right- and left-hand triodes of selector tube 2–V3–13 conduct only momentarily in response to the pip voltages. This modulation of the two voltage waves, (1) that incoming from the line circuit, and (2) that received from the timing of a pulsing circuit, accomplishes which is commonly known as point selection. When the left-hand triode of tube 2–V3–13 becomes momentarily conducting due to a voltage pip from the oscillator occurring during a space signal, as hereinbefore described, the potential of the grid on the left-hand triode of the selector-hold tube 2–V2–12 is momentarily lowered and tube 2–V2–12 thereby operates on the so-called "flip-flop" principle. Since the plates of the right- and the left-hand triodes of tube 2–V2–12 are connected to the grids, respectively, of the left- and right-hand triodes of tube 2–V2–12 by resistance-capacity coupling, not shown, only one triode of tube 2–V2–12 can conduct at a time and when one triode is cut off the other will simultaneously start to conduct. Thus, the left-hand triode of tube 2–V2–12 is caused to go from conducting (spacing) to the cut-off condition (marking) by momentarily lowering the voltage on the grid of the left-hand triode, the right-hand triode at this time becoming conducting. The voltage on the plate of the left-hand triode of tube 2–V2–12, together with the voltage on the grid of the output triode of tube 2–V1–11, will then become more positive and plate current will flow from the plate through the cathode of the output triode of tube 2–V1–11. The potential of the cathode of the output triode of tube 2–V1–11 will be raised to approximately 40 volts positive and since it is connected to the outgoing conductor of the line circuit a marking signal element will be repeated to the line circuit. Similarly, conduction of the left-hand triode of tube 2–V3–13 for a mark signal momentarily lowers the potential of the grid of the right-hand triode of vacuum tube 2–V2–12. The right-hand triode of tube 2–V2–12 is therefore cut off, and the left-hand triode is made conducting. The output triode of vacuum tube 2–V1–11 will therefore be cut off and its cathode will have a negative potential of approximately 40 volts. Thus a mark will be sent out over the outgoing conductor to the line circuit. The purpose of tube 2–V2–12 is to provide means for holding over the short pulses received from tube 2–V3–13 so that full length signal elements will be transmitted to the line circuit.

The purpose of the counting circuit is to keep the oscillator in operation once it has been started until a total of seven complete cycles have been generated. In performing this function the counting circuit counts eight pulses per character signal which are received from the timing and pulsing circuit. It counts the first positive pulse and seven successive negative pulses which follow. As soon as the eighth pulse (seventh negative pulse) is counted the oscillator is stopped. The counting circuit operates on a binary principle and consists of three interconnected "flip-flop" circuits. A characteristic of these circuits (first count, second count and third count) is that when a negative pulse is applied to both grids of a counting tube simultaneously, the tube circuit flips, that is, the triode that is conducting is cut off and the other tube begins to conduct. The circuit remains in this condition until the next available pulse is applied simultaneously to both grids at which time it "flops" the other way.

In the marking, or stop, condition, the input triode of tube 2–V1–11 is conducting, and its plate voltage is sufficiently low so that the right triode of the oscillator control tube 2–V6–16 to which it is connected, is cut off by a heavily negative bias on its grid. At this time, the oscillator is held inactive by a holding current which flows from ground through a retard coil (not shown) and the plate of the left-hand triode of stop-oscillator tube 2–V5–15, to a negative potential on the cathode of the left-hand triode of tube 2–V5–15. On reception of a start signal (spacing), the input triode of tube 2–V1–11 is cut off and the right-hand triode (oscillator control) of tube 2–V6–16 becomes conducting. The right-hand triode of tube 2–V6–16 becomes conducting simultaneously with the left-hand triode of selector-modulator tube 2–V3–13 because of a parallel connection, not shown. With the corresponding reduction in voltage on the plate of the right-hand triode tube 2–V6–16, the left-hand triode of tube 2–V5–15 is cut off and the oscillator holding circuit is interrupted to start the oscillator. The oscillator starts and generates the first positive pulse (start signal selection pulse) which is transmitted by means of the right-hand, or pulsing, triode of tube 2V4–14 through two capacitors 202 and 204 in parallel to the grids of the left-hand and right-hand triodes of tube 2–V3–13 (this first positive pulse reaches the two parallel paths in synchronism with the middle point of the incoming start signal element), with the result that the left-hand triode of tube 2–V3–13 is made to momentarily conduct and the right-hand triode of tube 2–V3–13 is consequently made non-conducting because of "flip-flop" operation.

Since the left triode (oscillator control) of tube 2–V6–16 is cut off at the start of each signal as a result of the start element timing, or selecting, pulse, a positive pulse is produced and applied to the grid of the left-hand triode of counting tube 3–V7–17. This pulse serves to "flip" tube 3–V7–17 and makes its left-hand triode conducting. As the plates of the left-hand triodes of counting tubes 3–V7–17 and 3–V8–18 are respectively connected to the grids of the left-hand triodes of tubes 3–V8–18 and 3–V9–19, tubes 3–V8–18 and 3–V9–19 will be "flipped" over to the left-hand triode conducting almost simultaneously with tube 3–V7–17 as a result of the first positive counting pulse (start element selecting pulse). The remaining seven pulses will be received by the counting circuit on the grids of both left- and right-hand triodes of tube 3–V7–17. Although the intervening positive pulses, referred to hereinbefore as pips, will also be applied to the grids of both triodes of tube 3–V7–17, it will not affect the counting circuit, for the following reasons:

(*a*) Momentarily raising the grid potential of the tube triode which happens to be conducting may slightly increase the plate current and lower the plate voltage. As this plate voltage is coupled to the grid of the non-conducting triode it will attempt to lower the potential of that grid.

(*b*) The grid potential of the triode which is cut off will not rise appreciably due to positive pulses received thereby because of the low impedance shunting effect of the plate circuit of the triode which is conducting.

The net effect of the positive pulse will lower the grid potential of the triode which is non-conducting and thereby oppose any tendency of the tube to "flip" as explained above in item (*a*). The first counting tube 3–V7–17 will be "flipped" by each negative pulse. This tube will accordingly be restored to the right triode conducting condition at the end of the character signal or upon the reception of an initial positive pulse followed by seven negative pulses. The grids of the right- and left-hand triodes of tube 2–V8–18 will receive only negative pulses from the left triode of tube 2–V7–17. Tube 3–V8–18 therefore "flips" in response to the counting pulses 1, 3, 5, and 7 which it receives indirectly from tube 3–V7–17. At the end of each character tube 3–V8–18 is left in the right triode conducting condition. Likewise, tube 3–V9–19 receives only negative pulses which it receives indirectly from the left triode of tube 3–V8–18. Tube 3–V9–19 "flips" in response to counting pulses 1 and 5 and at the end of each character signal it also will be left in the right triode conducting condition. The grids of the left-hand and right-hand triodes of tube 3–V9–19 are connected to the plate of the left-hand triode of tube 3–V8–18.

*Stopping a character*

At the end of a character signal all three counting tubes 3–V7–17, 3–V8–18 and 3–V9–19 will be in the right triode conducting condition and the potential on conductor 342 connecting the plate of the left triode of each of the counting tubes to the grid of the left-hand triode of tube 2–V6–16 will be raised sufficiently to cause the left-hand triode of tube 2–V6–16 to become conducting. The potential on the plate of the left-hand triode of tube 2–V6–16 will accordingly be lowered and the grid of the right-hand triode of tube 2–V6–16 will also drop in potential due to its connection to the plate of the left-hand triode. If at this time an incoming signal pulse is a stop element (marking), the input circuit will also tend to reduce the potential on the grid of the right-hand triode of tube 2–V6–16 and the right-hand triode will be cut off. The plate of the right-hand triode of tube 2–V6–16 will thereby apply a higher positive potential to the grid of the left-hand triode of tube 2–V5–15, which will conduct to stop the oscillator.

*Principal components of the electronic SOTUS unit*

The principal components of the electronic SOTUS unit are as follows:

(*a*) Means for obtaining teletypewriter signals for controlling the operation of the electronic SOTUS unit. These signals consist of the "start," "selecting" pulses Nos. 1 to 5 and the "stop" impulse.

(*b*) Means for recognizing the "Figures" signal entirely with electronic tubes so that no mechanical action of any sort occurs in response to signals incoming during the "deactivated" condition of the SOTUS unit.

(*c*) Means for causing the reception of "Figures H" signal codes to release the relays for activating the SOTUS unit, and, after the unit is deactivated, for causing the SOTUS unit to become deactivated in response to a "carriage return" signal.

(*d*) Means for recognizing two-character signal codes when the SOTUS unit is in an activated condition, and for causing the recognition of the next code to connect one or more teletypewriters to the line circuit.

*Obtaining of selecting pulses Nos. 1 to 5 and pulse No. 6*

The selecting pulses employed in the particular version of the recognition principle used in the electronic SOTUS unit of the present invention, are of a positive potential of 130 volts which start at the mid-point of their corresponding impulses in the output of the regenerative repeater, and each is of a duration of 5 milliseconds. Pulse No. 6 is also of a positive potential slightly above 100 volts and starts at about half a pulse length after the beginning of the "stop" pulse; this pulse No. 6 also has a duration of about 5 milliseconds. Such impulses can be obtained in a number of ways, one of which, as hereinbefore stated, is from the electronic regenerative repeater. The electronic regenerative repeater is employed herein for producing the five selecting pulses and pulse No. 6 required for the operation of the electronic SOTUS unit. For this purpose the counting circuit (tubes 3–V7–17, 3–V8–18 and 3–V9–19) of the repeater is used as the basic source of pulses, and, by means of five twin triode vacuum tubes 4–T1, 4–T2, 4–T3, 4–T4 and 4–T5, a single triode vacuum tube 7–T6, a number of resistors, capacitors and small neon lamps external to the repeater, the high voltage 5-millisecond pulses are produced. It is understood that the necessary pulses could be obtained by means other than those employed herein, among such other means being a circuit comprising only cold cathode tubes of either two- or three-element types.

Since the pulses for controlling the electronic SOTUS unit may be derived in so many different ways, the explanation of the operation of the SOTUS unit will be made on the assumption that pulses of the type described are available. At the end of this specification under the caption "Pulse Circuit" a description of how the pulses are obtained from the electronic regenerative repeater will be included.

*General principles of operation*

Like the teletypewriter, the SOTUS unit examines the five selecting impulses of a character signal code, determines from the examination what action should be taken, and then on a sixth pulse, or pulse No. 6, takes the necessary action. Pulse No. 6 is obtained from the plate of the right-hand triode of tube 2–V6–16 at the end of each teletypewriter signal that is received and will be described hereinafter in more detail.

The first action taken by the SOTUS unit in the deactivated condition is to operate an electromagnetic relay 6–FIG when the "Figures" signal code is received. The relay is in the main anode circuit of tube 6–FIG′ which is of the 313–C cold cathode type and is referred to herein as the "Figures" tube. Relay 6–FIG is operated by pulsing the control electrode of the "Figures" tube 6–FIG′ whereby the tube is ionized. A pulse which actually causes the "Figures" tube to ionize and operate relay 6–FIG is the pulse No. 6. Since it is desired that the "Figures" relay be operated only when the "Figures" signal code is received, it is necessary that whenever any signal code other than "Figures" is received, pulse No. 6 must be prevented from reaching the control electrode of the "Figures" tube 6–FIG′ so that the "Figures" relay is prevented from operating. To prevent pulse No. 6 from reaching the control electrode of the "Figures" tube 6–FIG′, tube 6–FN, also a cold cathode tube, is bridged from the control electrode of the "Figures" tube 6–FIG′ to source 601 of negative potential of 90 volts, the bridging path extending from the main anode of tube 6–FN, resistor 602 having a resistance, say of 0.1 megohm, varistor-rectifier 603, resistor 604 having a resistance, say of 0.1 megohm, to the control electrode of tube 6–FIG′. Source 601 is connected to the cathode of tube 6–FN. When tube 6–FN is in an ionized condition, the voltage drop between its main anode and its cathode is about 70 volts. Thus the potential at the main anode will be about 20 volts negative whenever the tube is ionized. If tube 6–FN happens to be ionized at the time when pulse No. 6 occurs, pulse No. 6 will then be shunted to source 601 through the gap in tube 6–FN and will not reach the control electrode of tube 6–FIG′. The problems then is that on any character signal code other than "Figures," tube 6–FN will ionize before pulse No. 6 occurs, and when pulse No. 6 does occur, it will be prevented from reaching the control electrode of tube 6–FIG′, therefore tube 6–FIG′ will not ionize and relay 6–FIG will not be operated. If the character signal code received is "Figures," tube 6–FN will not be ionized, pulse No. 6 will then reach the grid of tube 6–FIG′ and thereby ionize tube 6–FIG′ and operate relay 6–FIG. It will be noted from the above that tube 6–FN ionizes to cause current to flow in response to any character signal except "Figures" and that tube 6–FIG′ ionizes to cause current to flow therethrough in response to the "Figures" character signal only.

A brief description of the manner of obtaining pulse No. 6 will now be given. Pulse No. 6 actually occurs simultaneously with the change of voltage on the plate of the left-hand triode of tube 2–V6–16 of the regenerative repeater from a positive potential of 130 volts to a negative potential of 30 volts. It is this change of voltage on the plate of tube 2–V6–16 that is used to create pulse No. 6. Pulse No. 6 occurs as a result of the end of each character signal incoming at the regenerative repeater, when all three counting tubes 3–V7–17, 3–V8–18 and 3–V9–19 will be in their normal condition, that is, the right-hand triode conducting condition, at which time the potential on the grid of the left-hand triode of tube 2–V6–16, obtained from the plates of the left-hand triodes of the three counting tubes 3–V7–17, 3–V8–18 and 3–V9–19, is raised sufficiently to cause the left-hand triode of tube 2–V6–16 to conduct. The plate potential in the left-hand triode of tube 2–V6–16 will accordingly be lowered and the grid of the right-hand triode of this tube will also drop in potential due to its connection with the plate of the left-hand triode. If at this time the incoming signal is a stop element (marking), the reduced potential on the plate of the input (right-hand) triode of tube 2–V1–11 is applied to the grid of the right-hand triode of tube 2–V6–16 and the right-hand triode of tube 2–V6–16 will be cut off. The plate of the right-hand triode of tube 2–V6–16 will thereby apply a high positive potential to the grid of the left-hand triode of tube 2–V5–15 to stop the oscillator. This positive potential applied to the grid of the left-hand triode of tube 2–V5–15 is also applied to a circuit path extending over conductor 201, condenser 701, varistor-rectifiers 702 and 703, connection points 704 and 705, conductor 706, outer upper armature and back contact of relay 6–FIG, conductor 610, resistor 611, varistor-rectifier 603, resistor 602, to the main anode of tube 6–FN. This positive potential is applied to the main anode of tube 6–FN sufficiently long to maintain tube 6–FN fired for a few milliseconds after the termination of each incoming repeatered signal other than the signal for "Figures."

*Selection circuit*

Figure 4:
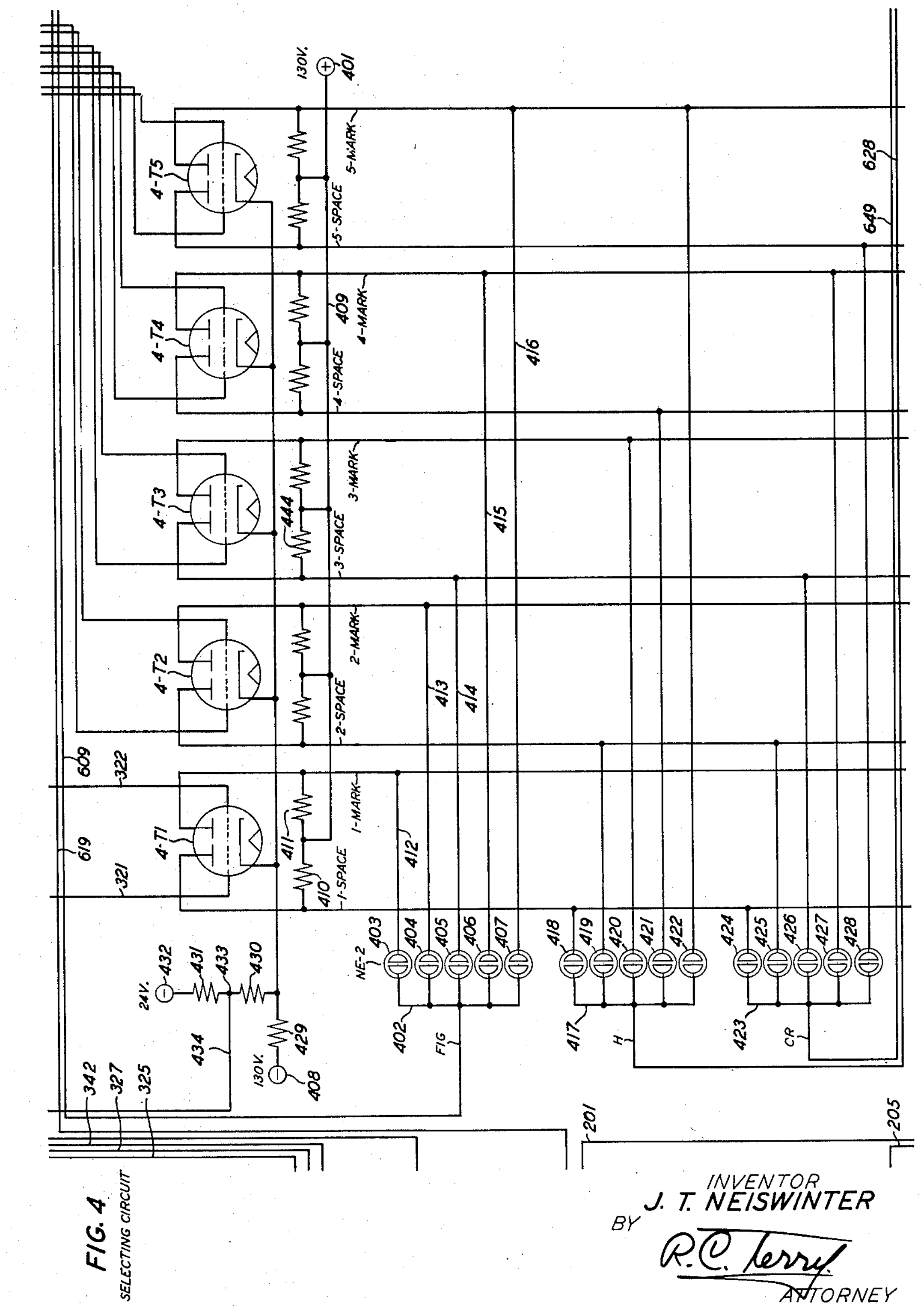
Figs. 4 and 5 show the selection circuit wherein the individual impulses of each signal are used in their respective permutatable combinations to activate the SOTUS unit and operate the circuits individual to the address codes.
Figure 5:
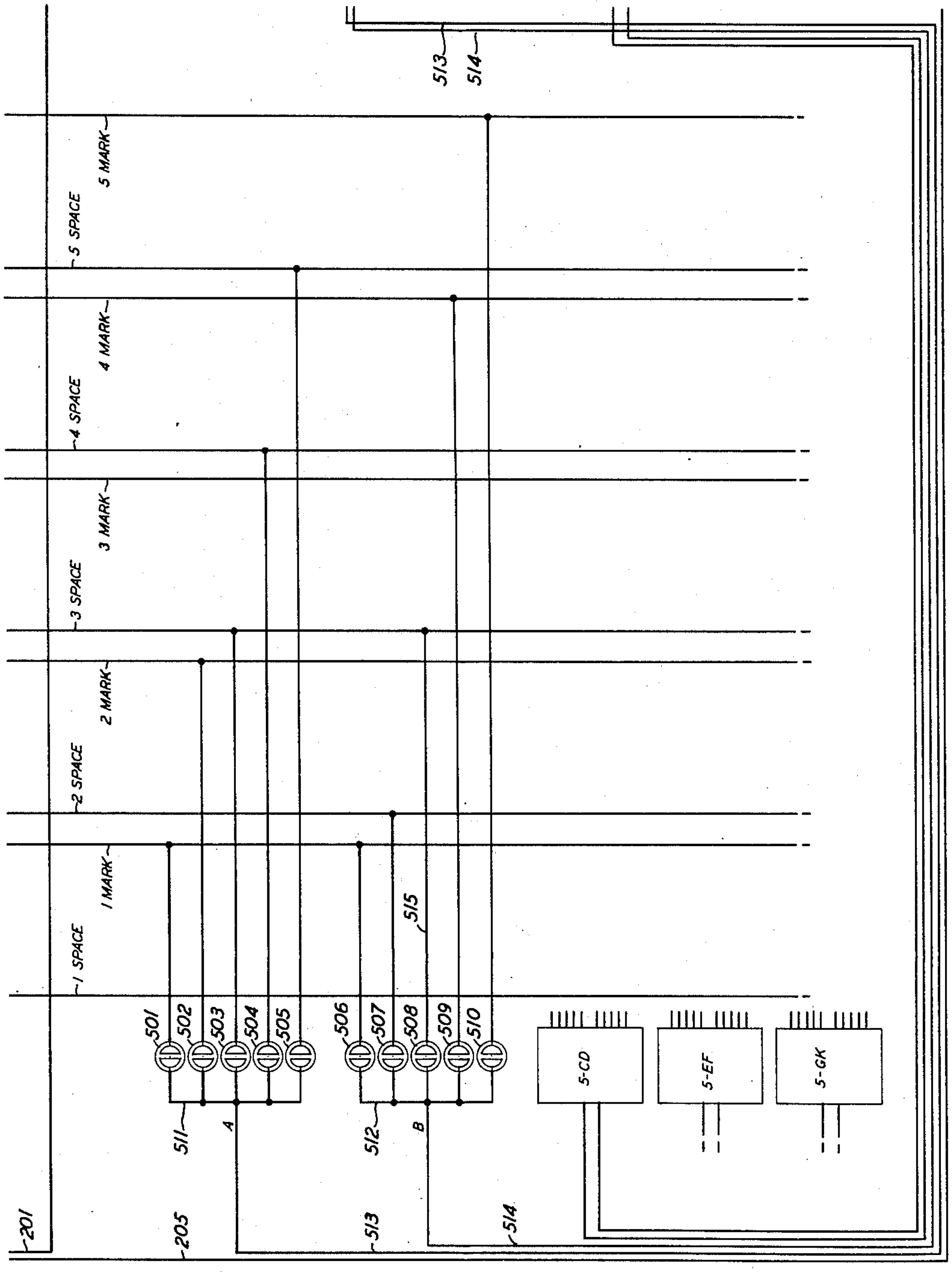
Figure 6:
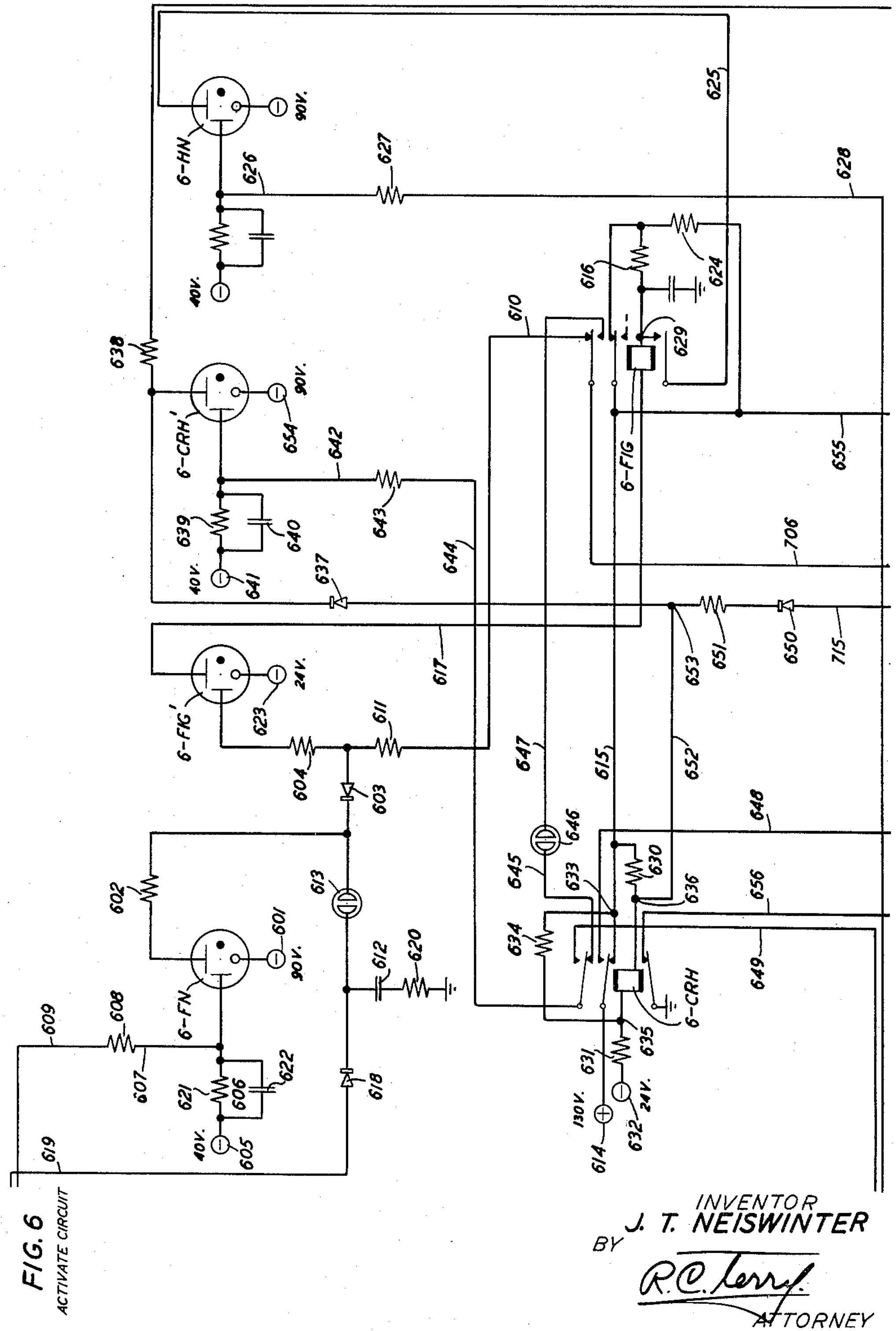
Fig. 6 shows the activate circuit which when operated, conditions the SOTUS unit for receiving the address codes.

The selection circuit shown in Fig. 4 provides for the examination of selecting pulses Nos. 1 to 5 of each incoming repeatered character signal, and for causing tube 6–FN to fire whenever one or more of the incoming selecting pulses are found not to be in accordance with a code for the "Figures" signal. Thus, since the "Figures" signal comprises mark, mark, space, mark, mark, and whenever a character code signal is received in which one or more of the selecting pulses differs from those constituting the "Figures" signal, the control electrode of tube 6–FN will be pulsed once for each pulse that differs. Tube 6–FN will be fired on the first of such pulses and will remain fired, or ionized, until after the occurrence of pulse No. 6. After tube 6–FN has done its function of suppressing pulse No. 6, the potential at the main anode of tube 6–FN is momentarily reduced to zero so that the tube is deionized and ready for firing again on the next character signal if such signal is not for "Figures."

The selection circuit comprises five twin triode tubes 4–T1, 4–T2, 4–T3, 4–T4, 4–T5, one twin triode being associated with each selecting pulse received from the counting circuit of the regenerative repeater as will be hereinafter described under "Pulse Circuit." Tubes 4–T1 to 4–T5 are preferably of the 6J6 type. When the first selecting pulse of a character is marking, a negative pulse is applied to the grid of the left-hand triode of tube 4–T1. When the first selecting pulse of a character signal is spacing, a negative pulse is applied to the grid of the right-hand triode of tube 4–T1. Both triodes of the tube are normally conducting, and a negative pulse makes that triode to which it is momentarily applied, go non-conducting momentarily. The voltage at the plate of each triode of the tube is normally negative, and when the negative pulse is applied to one of the grids the voltage of the plate of that triode goes to a positive potential of about 130 volts, the voltage of source 401. The negative pulse is applied to the grid of a triode at the mid-point of the mark or the space pulse, and for about 5 milliseconds. The voltage at the plate accordingly goes from negative to positive potential of 130 volts starting at the mid-point of the selecting pulse, and lasting for about 5 milliseconds. Tube 4–T2 operates in a like manner for incoming selecting pulse No. 2 and tubes 4–T3, 4–T4 and 4–T5 similarly for selecting pulses Nos. 3, 4 and 5, respectively.

The control electrode of tube 6–FN is connected in a circuit traceable from source 605 of negative potential of 40 volts, resistor-condenser network 606, conductor 607, resistor 608 having a resistance, say of 0.68 megohm, conductor 609, to "Figures" bus conductor 402. Bus conductor 402 is referred to herein as the "Figures" conductor because it is associated with the selection of the "Figures" signal although it carries no current in response to the "Figures" signal. The circuit from conductor 402 is fanned-out through five small neon lamps 403, 404, 405, 406 and 407. Each of these lamps has only two elements and exhibits the property of being entirely an open circuit until a minimum of 70 to 90 volts is applied across the two elements. The lamp then fires and, while carrying current, exhibits a constant voltage across the two terminals of about 10 volts or so less than the voltage at which the lamp is fired. This constant voltage is substantially independent of the amount of current flowing through the lamp, and is present even for such small values of current as a few microamperes. The purpose of the selection circuit is to cause tube 6–FN to ionize in response to any incoming repeatered signal except the "Figures" signal. On every signal received one or the other of the triodes of each of the tubes 4–T1 to 4–T5 will be cut off, its plate will swing to a positive potential of 130 volts, and that potential will appear on the bus conductor connected to that plate. These bus conductors are connected in multiple through a neon lamp of one or more of the groups of five lamps in the selection circuit. The bus conductors have been designated "MARK" and "SPACE" accordingly as they remain in the normal condition and do not swing to the positive potential of 130 volts when the twin triode tubes with which they are associated respond to signal conditions or pulses corresponding to those designations. When the selecting pulse is marking, the left-hand triode is cut off, the right-hand triode remains conducting, its associated bus conductor undergoes no potential change and thus the right-hand bus conductor is designated "MARK." When the selecting pulse is spacing the right-hand triode is cut off, the left-hand triode remains conducting, its associated bus conductor undergoes no potential change and thus the left-hand bus conductor is designated "SPACE." Should the first selecting pulse of a character signal received from the regenerative repeater be marking whereby a pulse of negative potential is applied to the grid of the left-hand triode of tube 4–T1 and the left-hand triode accordingly becomes non-conducting, a position voltage pulse would be applied over a path extending from source 401, conductor 409, resistor 410 having a resistance, say of 15,000 ohms, to bus conductor 1–SPACE being connected, in multiple, to the first neon lamp of each group of five associated with a signal combination wherein the first selecting impulse is spacing. Should the first selecting impulse of the signal received from the repeater be spacing whereby a pulse of negative potential is applied to the grid of the right-hand triode of tube 4–T1 and the right-hand triode accordingly becomes non-conducting, a voltage would be applied over a path extending from source 401, conductor 409, resistor 411 also having a resistance, say of 15,000 ohms, to bus conductor 1–MARK, but conductor 1–MARK being connected, in multiple, to the first neon lamp of each group of five associated with a signal combination wherein the first selecting pulse is marking.

The bank of lamps comprising lamps 403 to 407, inclusive, is provided to decode the "Figures" signal, and an additional bank of five neon lamps is provided for each of certain other teletypewriter signals such as those for "H," "Carriage Return" and the desired letters of the alphabet that are used in two-letter combinations for address codes. The lamps are connected to the bus conductors in accordance with the code elements of the signals that they are to decode.

Since the general purpose of the selecting circuit is to avoid firing tube 6–FN when the "Figures" signal is received, which means avoiding applying any pulses to the control electrode of tube 6–FN during the reception of the incoming repeatered signal, each of the neon lamps 403, 404, 405, 406 and 407 is connected to its respective selecting tube of tubes 4–T1, 4–T2, 4–T3, 4–T4 and 4–T5 on the basis of no pulses being received by the neon lamps during the reception of the "Figures" signal. Thus on a response to a "Figures" character signal which is mark, mark, space, mark, and mark, the normally conducting left-hand triode of each of tubes 4–T1, 4–T2, 4–T4 and 4–T5 and the normally conducting right-hand triode of tube 4–T3 become non-conducting whereby the plate of each of the left-hand triode of tubes 4–T1, 4–T2, 4–T4 and 4–T5 and the plate of the right-hand triode of tube 4–T3 attains a positive potential of 130 volts from source 401 and this voltage is also applied to each of the conductors 1–SPACE, 2–SPACE, 3–MARK, 4–SPACE and 5–SPACE. Since none of these conductors is connected to any of lamps 403 to 407, inclusive, no firing potential would be applied across the control gap of tube 6–FN in response to "Figures" signal and therefore tube 6–FN does not fire at this time. In other words, in order to avoid having a selecting tube activate its corresponding neon lamp of lamps 403 to 407, inclusive, during the reception of the "Figures" signal, the plates of those triodes which remain conducting in response to the "Figures" signal have a low potential and since these plates are connected to those bus conductors to which are connected the lamps 403 to 407, respectively, no current pulse passes through any of these lamps. For example, the left-hand triode of tube 4–T1 stops conducting in response to the first impulse (marking) of a "Figures" signal and the potential at its plate increases, due to the cutting off of plate current through the triode, resistor 410, to a positive voltage of approximately 130 volts, the voltage of source 401. This voltage is applied to conductor 1–SPACE which is not connected to lamp 403. Conductor 1–MARK receives no pulse at this time because the right-hand triode of tube 4–T1 does not receive the first impulse, which is marking, and therefore remains conducting. The left-hand triode of tube 4–T2 stops conducting in response to the second impulse (marking) of the "Figures" signal and a positive potential of approximately 130 volts, the voltage of source 401, is impressed on conductor 2–SPACE which is not connected to lamp 404. The right-hand triode of tube 4–T3 stops conducting in response to the third impulse (spacing) and the positive potential is impressed on conductor 3–MARK which is not connected to lamp 405. The left-hand triode of tube 4–T4 stops conducting in response to the fourth impulse (marking) and the positive potential is impressed on conductor 4–SPACE which is not connected to lamp 406. The left-hand triode of tube 4–T5 stops conducting in response to the fifth impulse (marking) and the positive potential is impressed on conductor 5–SPACE which is not connected to lamp 407. On the basis of the above-mentioned circuit conditions, when the "Figures" signal is received, no pulse is applied to any of the five neon lamps 403 to 407, inclusive, since these lamps are cross-connected to those plates of the selecting tubes 4–T1 to 4–T5 that have no pulse present on them for this particular signal.

If the signal received by the selecting tubes is "Letters" which consists of all five selecting pulses being marking, lamps 403 to 407, inclusive, respond as follows: The left-hand triodes of tubes 4–T1 and 4–T2 become non-conducting in response to impulses Nos. 1 and 2, respectively, and the respective plates of the left-hand triodes of tubes 4–T1 and 4–T2 attain a positive potential of 130 volts which is also applied to conductors 1–SPACE and 2–SPACE but neither of these conductors is connected to its corresponding lamp of lamps 403 to 407, inclusive. In response to impulse No. 3 the left-hand triode of tube 4–T3 becomes non-conducting and the plate of the left-hand triode of tube 4–T3 attains the positive potential of 130 volts which is applied to conductor 3–SPACE and since conductor 3–SPACE is connected by conductor 414 to lamp 405, lamp 405 fires and passes a pulse to conductor 609. In response to pulses Nos. 4 and 5, the left-hand triodes of tubes 4–T4 and 4–T5 become non-conducting and the respective plates of the left-hand triodes of these tubes attain a positive potential of 130 volts which is applied to conductors 4–SPACE and 5–SPACE, but neither of these conductors is connected to its corresponding lamp. The current passing through lamp 405 flows through the circuit including bus conductor 402, conductor 609, resistor 608, conductor 607 and resistor 621 to negative voltage source 605. The control electrode of tube 6–FN is raised to the firing potential and the discharge transfers to the main gap which remains conductive until after pulse No. 6 is received. The reception of the "Letters" signal has caused tube 6–FN to be fired by one pulse, namely that occurring in response to selecting pulse No. 3.

If the signal incoming at the selecting tubes 4–T1 to 4–T5 is "Space" which has pulses Nos. 1 and 2 spacing, pulse No. 3 marking and pulses Nos. 4 and 5 spacing, this signal is the complete opposite in the make-up of the "Figures" signal. An examination of the selecting circuit will indicate that on the "Space" signal, each of neon lamps 403 to 407, inclusive, associated with the decoding of the "Figures" signal is connected to a conductor on which a pulse will appear. Thus the control electrode of tube 6–FN will receive five pulses. Only the first pulse is necessary since once the tube is fired it will remain in this condition until the plate voltage is dropped momentarily below a value of 70 volts more positive than the cathode voltage, which does not occur until after pulse No. 6 has occurred. Since the cathode of tube 6–FN is connected to source 601 of negative potential of 90 volts and the pulse applied to the incoming side of one or more of neon lamps 403 to 407, inclusive, is at a positive potential of about 130 volts, there is thus a total value of about 210 volts applied across each neon lamp and tube 6–FN connected therewith in series. Tube 6–FN and each of the neon lamps require in the neighborhood of 70 volts to be ionized or a total of 140 volts or so for the tube and a lamp in series. The firing voltage actually applied to these devices in series thus offers a considerable margin over the minimum voltage required.

Tube 6–FN is caused to fire on every character signal of a teletypewriter code except one which is for "Figures," by cross-connecting the control electrode of tube 6–FN through five neon lamps to the proper anode in each of the selecting tubes 4–T1 to 4–T5, respectively.

Two sets of five neon lamps each are provided for each address code of the signal combinations serving in the selection of a teletypewriter for connection to the line circuit through the SOTUS unit. There is one SOTUS unit for each station and the SOTUS unit is arranged to connect to a line circuit individually the teletypewriters located at the station. Lamp sets comprising lamps 501 to 505, inclusive and lamps 506 to 510, inclusive, are respectively associated with letters A and B of address code AB and the lamps represented by block 5–CD are associated with letters C and D of address code CD. Several teletypewriters at different stations may be selected through a group code pair of lamp sets at each station in establishing connections, whereby a message may be sent over the line circuit to the teletypewriters of the group simultaneously. At one only of the stations connected to the line circuit are provided, in addition to the pairs of lamp sets for the address codes of the teletypewriters located at that station, pairs of lamp sets for the address codes assigned to the teletypewriters located at all of the other stations on the line circuit. The purpose in providing the additional lamp sets at one station is to permit a message directed to a teletypewriter located at one of the other stations but whose address code is garbled in transmission, to be recorded at a station arranged to record all lost messages. The means for reclaiming lost messages will be hereinafter described.

*Activate circuit*

When any character signal except that for "Figures" is received at a time when the SOTUS unit is in a deactivated condition the SOTUS unit is non-responsive. When the character signal for "Figures" is received the electromagnetic relay 6–FIG operates. When the character signal following that for "Figures" is anything but the "H" signal, electromagnetic relay 6–FIG releases but when the character signal following the "Figures" signal is the "H" signal, relay 6–CRH which is operated during the deactivate time of the SOTUS unit, is released, thus activating the SOTUS unit.

The winding of relay 6–FIG is connected in a circuit normally extending from source 614 of a positive potential of 130 volts, inner upper armature and front contact of relay 6–CRH in its operated condition, conductor 615, inner upper armature and back contact of relay 6–FIG, resistor 616 having a resistance, say of 2000 ohms, through the winding of relay 6–FIG, conductor 617, to the main anode of tube 6–FIG′. In this normal condition, that is, when the SOTUS unit is deactivated, a positive potential of 130 volts is applied to the plate of tube 6–FIG′. However, when relay 6–CRH is in its released condition, which is the activated condition of the SOTUS unit, the SOTUS unit does not search for the "Figures" signal and source 614 is accordingly disconnected from the winding of relay 6–FIG.

The control electrode of tube 6–FIG′ is connected to a pulsing circuit extending through resistor 604 having a resistance, say of 0.1 megohm, resistor 611 having a resistance, say of 1.0 megohm, conductor 610, back contact and outer upper armature of relay 6–FIG, conductor 706, potentiometer connection 705, connection point 704, varistor-rectifiers 703 and 702, condenser 701, connection point 725, conductor 201, resistor 212 having a resistance, say of 0.1 megohm, to source 203 of positive potential of 130 volts. The plate of the right-hand triode of tube 2–V6–16 is connected in parallel with resistor 212 so that when pulse No. 6 occurs at the plate of the right-hand triode of tube 2–V6–16 as a positive swing when the triode returns to its non-conducting condition at the end of a signal incoming at the repeater, it is applied to the conrol electrode of tube 6–FIG′ over the circuit just traced. Without tube 6–FN the pulse No. 6 at the end of each incoming character signal would be effective to fire tube 6–FIG′ in response to each character signal, because tube 6–FIG′ deionizes between adjacent character signals. Since tube 6–FIG′ is to be fired only in response to the "Figures" signal, tube 6–FN is employed to fire in response to all other signals. In this manner the firing of tube 6–FN prevents tube 6–FIG′ from firing on all character signals other than that for "Figures."

The control anode of tube 6–FIG′ is also connected in a path extending through varistor-rectifier 603 and resistor 602 having a resistance, say of 0.1 megohm, to the main anode of tube 6–FN, and the main anode of tube 6–FN is also connected in an additional path at the junction of varistor 603 and resistor 602, through neon lamp 613, varistor-rectifier 618, conductor 619, resistor 214 having a resistance, say of 0.1 megohm, to source 203 of positive potential of 130 volts. Conductor 619 is also connected to the plate of the left-hand triode of tube 2–V6–16 in the regenerative repeater. The potential at the plate of the left-hand triode of tube 2–V6–16 is 130 volts positive during the five selecting impulses and the stop impulse from a character signal, and changes to a negative potential of about 30 volts during the last half of the stop impulses. During the five selecting impulses and the first half of the stop impulse of a character signal the positive potential of 130 volts is applied through varistor-rectifier 618, neon lamp 613, resistor 602, to the main anode of tube 6–FN, neon lamp 613 reducing the positive potential of 130 volts to a positive potential of about 70 volts. This reduced potential between the main anode and cathode of tube 6–FN is not sufficient to fire the tube directly and independently of the control circuit of the tube. Connected in the main anode circuit of tube 6–FN at a point between varistor-rectifier 618 and neon lamp 613, is a path wherein is included in series connection to ground, condenser 612 having a capacitance, say of 0.01 microfarad, and resistor 620 having a resistance, say of 0.18 megohm. The purpose of this path to ground is to hold a positive voltage on the main anode of tube 6–FN for a few milliseconds after the voltage on the plate on the left-hand triode of tube 2–V6–16 in the regenerative repeater has changed to a negative potential of 30 volts. The control anode of tube 6–FN is connected through network 606 including resistor 621 having a resistance, say of 4.7 megohms, and condenser 622 having a capacitance, say of 0.001 microfarad, in parallel, to source 605 of negative potential of 40 volts. The purpose of the network 606 is to shunt away from the control electrode of tube 6–FN voltages induced from other circuits in the wiring arrangement and thus prevents false firing of tube 6–FN. The negative potential of 40 volts at which the control electrode of tube 6–FN is normally held is only 50 volts above the negative potential of 90 volts applied by source 601 to the cathode and this voltage difference is not sufficient to cause the tube to fire. The control electrode of tube 6–FN is connected through resistor 608 having a resistance, say of 0.68 megohm, to the "Figures" bus conductor 402, and as hereinbefore described under "Selection Circuit," conductor 402 is connected through five neon lamps 403 to 407, inclusive, to the selection circuit in such a manner that a pulse is transmitted to the control electrode of tube 6–FN through one or more of lamps 403 to 405, inclusive, for each received character signal except "Figures." The operation of the "Figures" part of the activate circuit then is that on each character signal, except the "Figures" signal, tube 6–FN fires on one of the selecting impulses of the character signal and prevents the firing of tube 6–FIG′ in response to the No. 6 pulse.

After 6–FN fires, it remains in a conducting condition during the remainder of the character signal due to the positive potential applied to its main anode by the plate of the left-hand triode of tube 2–V6–16 in the regenerative repeater. At the end of the character signal, pulse No. 6 is applied to the control electrode of tube 6–FIG′, but because tube 6–FN is conducting at the time in response to a character signal other than "Figures," the pulse will be shunted over the path extending over varistor-rectifier 603, resistor 602, main anode cathode of tube 6–FN, to source 601 of negative potential of 90 volts, and tube 6–FIG′ will not fire.

As hereinbefore described, pulse No. 6 occurs simultaneously with the change of potential at the plate of the left-hand triode of tube 2–V6–16 of the regenerative repeater from positive potential of 130 volts to a negative potential of 30 volts, which change also stops the oscillator in the repeater. The positive potential from source 203 is stored on condenser 612 and after the change in potential at the plate of the left-hand triode of 2–V6–16 occurs, the charge stored on condenser 612 retains the positive potential on the main anode of tube 6–FN for a sufficient duration to keep tube 6–FN fired until pulse No. 6 has been dissipated. After pulse No. 6 is dissipated the potential at the main anode of tube 6–FN decreases to a negative potential of 30 volts at which main anode voltage the tube is extinguished. At the beginning of the next incoming character signal the potential at the plate of the left-hand triode of tube 2–V6–16 becomes positive 130 volts which is again applied through neon lamp 613 to the main anode of tube 6–FN for use if tube 6–FN is fired during this incoming character signal.

When the "Figures" signal is received tube 6–FN receives no firing impulse and consequently remains unfired throughout the reception of such signal impulse. At the end of the signal, pulse No. 6 is not shunted through main anode-cathode of tube 6–FN to source 601 as hereinbefore described, and accordingly causes tube 6–FIG′ to fire. Tube 6–FIG′ upon firing, causes current to flow in a circuit traceable from source 614 of positive potential of 130 volts, inner upper armature and front contact of relay 6–CRH, conductor 615, inner upper armature and back contact of relay 6–FIG, resistor 616, connection point 629, through the winding of relay 6–FIG, conductor 617, main anode and cathode of tube 6–FIG′, to source 623 of neagtive potential of 24 volts.

Relay 6–FIG operates to include resistor 624 having a resistance, say of 8200 ohms, in the operating circuit of relay 6–FIG, to reduce the holding current in the relay winding and to obtain a quicker release of the relay when its release is required as will be hereinafter described. Also relay 6–FIG, upon operating, connects at its lower armature and front contact the positive side of its finding to a path extending over conductor 625 to the main anode of tube 6–HN. The control electrode of tube 6–HN is connected to a circuit extending over conductor 626, resistor 627 having a resistance, say of 0.68 megohm, conductor 628, to the "H" bus conductor 417 of the neon lamps 418 to 422, inclusive, of the selection circuit. Lamps 418 to 422, inclusive, are associated with the character signal for the letter "H," therefore none of these lamps will pass current in response to the signal for the letter "H" to cause tube 6–HN to fire.

If the character signal following that for "Figures" is not the signal for the letter "H," tube 6–HN will fire, and, in doing so, will make the potential at connection point 629 negative at a voltage of about 20 volts. The negative voltage now applied to the path extending through the winding of relay 6–FIG, to the main anode of tube 6–FIG′ will extinguish tube 6–FIG′ thereby causing relay 6–FIG to release. Relay 6–FIG upon releasing, causes tube 6–HN to become extinguished.

If the character signal following that for "Figures" is for the letter "H" having elements such as space, space, mark, space and mark, positive voltage will be applied to conductors 1–MARK, 2–MARK, 3–SPACE, 4–MARK and 5–MARK in the selection circuit shown in Fig. 4. None of these conductors is connected to lamps 418 to 422, inclusive, and therefore tube 6–HN will not be fired in response to the selecting impulses of the signal for the letter "H." Accordingly, relay 6–FIG will remain operated during the reception of the signal for letter "H."

Assuming that the SOTUS unit is in a deactivated condition at the time the "Figures H" signal combinations are received, relay 6–CRH will be in an operated condition. Relay 6–CRH in its normal condition, is held operated in a circuit traceable from source 614 of positive potential of 130 volts, inner upper armature and front contact of relay 6–CRH, resistor 630 having a resistance, say of 22,000 ohms, through the winding of relay 6–CRH, resistor 631 having a resistance, say of 1200 ohms, to source 632 of a negative potential of 24 volts. Associated with this holding circuit is a parallel path extending from connection point 633, resistor 634 having a resistance of 5000 ohms, to connection point 635. This parallel path is for the purpose of creating an additional current flow through the resistor 631, the resistance of which will increase the voltage at connection point 635 to a value more positive than it would be without the holding circuit by itself, thus tending to reverse the current in the winding of relay 6–CRH at the time when tube 6–CRH′ fires as will be hereinafter described, and reduce the release time of relay 6–CRH.

While relay 6–CRH is in its operated condition the positive voltage at connection point 636 is ineffectively applied through varistor-rectifier 637 to the plate of tube 6–CRH′. At the same time a positive potential of 65 volts is also applied to the main anode of tube 6–CRH′ over a circuit extending from the potentiometer 719 comprising source 720 of positive potential of 130 volts and resistors 721 and 722 each having a resistance, say of 5000 ohms, left-hand contact and armature of "negative pulse" relay 7–NP, connecting point 707, conductor 708, resistor 638 having a resistance, say of 0.18 megohm, to the plate of tube 6–CRH′. The voltage in the latter circuit is higher than that at connection point 536 and, due to the varistor-rectifier 637, predominates over the lower voltage at the main anode of tube 6–CRH′. The control electrode of tube 6–CRH′ has the usual protective network comprising resistor 639 having a resistance, say of 4.7 megohms, and condenser 640 having a capacitance, say of 0.001 microfarad, which protects the input of tube 6–CRH′ against surges in the wiring, the network being connected to the control electrode biasing source 641 of negative potential of 40 volts. The control electrode of tube 6–CRH′ is also connected to a circuit path extending over conductor 642, resistor 643 having a resistance, say of 0.68 megohm, conductor 644, outer upper armature and front contact of relay 6–CRH, conductor 645, neon lamp 646, conductor 647, front contact and outer upper armature of relay 6–FIG in its operated condition, conductor 706, connection point 705 of a potentiometer and short pulse, or pulse No. 6, connection point 704, varistor-rectifiers 703 and 702, condenser 701, conductor 201 to the plate of the right-hand triode of tube 2–V6–16, the source of pulse No. 6. It is assumed that the "Figures" signal has been received to operate relay 6–FIG and that the next character signal to be received is letter "H" which allows relay 6–FIG to remain operated inasmuch as tube 6–HN remains unfired in response to the signal for letter "H," and the operating potential applied to the main anode of tube 6–FIG′ through the winding of relay 6–FIG is not reduced to the tube quenching point at this time. Pulse No. 6 occurring at the end of the signal for letter "H" is impressed by the right-hand triode of tube 2–V6–16 over the circuit hereinbefore traced, on the control electrode of tube 6–CRH′ and tube 6–CRH′ fires. With tube 6–CRH′ in its ionized condition the voltage at its anode decreases to a negative potential of about 20 volts. This decrease in potential causes current in the winding of relay 6–CRH to reverse a small amount since the voltage on connection point 635 at this relay will be slightly positive at this time due to current flowing in the path including resistors 634 and 631 as hereinbefore described. The normally operated relay 6–CRH now releases. Relay 6–CRH upon releasing, closes a circuit extending from source 614 of positive potential of 130 volts, inner upper armature and back contact of relay 6–CRH, conductor 648, resistor 709 having a resistance of 8200 ohms, through the winding of relay 7–LP, conductor 710, to the plate of tube 7–T6. This circuit operates relay 7–LP when tube 7–T6 conducts in response to a pulse No. 6 at the end of each of the subsequent letter signals of the address code, whereby the SOTUS unit is activated to search for the switching, or directing, signals of the address codes. Following the reception of the signals for "Figures H," the directing signals of the address code for connecting one or more teletypewriters are usually received. In the arrangement shown herein each address code consists of two character code signals and the function performed by these signals will be hereinafter described.

It will now be assumed that one or more of these address codes had been received and that the "carriage return" signal which deactivates the SOTUS unit, is received. Relay 6–CRH upon releasing, removed at its inner upper armature and front contact source 614 of positive potential of 130 volts from the winding of relay 6–FIG whereby the relay releases. Relay 6–FIG would release anyway upon the receipt of the signal other than that of the letter "H," immediately following the "Figures" signals. Also, relay 6–CRH upon releasing, transfers at its outer upper armature the control electrode of tube 6–CRH′, from the pulse No. 6 circuit path to a path extending over conductor 649 to the "carriage return" bus conductor 423 which is connected through five neon lamps 424 to 428, inclusive, to the selection circuit and now tube 6–CRH′ will fire in response to the selecting impulses of every character signal except the "carriage return" signal.

Since relay 6–CRH upon releasing, applies a positive potential of 130 volts to the winding of relay 7–LP to cause relay 7–LP to momentarily operate under the control of the pulse No. 6 received from the right-hand triode of tube 2–V6–16, over a circuit path extending over conductor 201, condenser 711 having a capacity, say of 0.01 microfarad, varistor-rectifier 712, resistor 713 having a resistance, say of 0.68 megohm, to the grid of tube 7–T6. A contact protective device is provided by a path comprising condenser 723 having a capacitance of 0.1 microfarad and resistor 724 having a resistance, say of 1000 ohms. During the activated condition of the SOTUS unit and immediately following each pulse No. 6, relay 7–LP will connect at its armature and front contact source 714 of positive potential 130 volts to a circuit extending over conductor 715, varistor-rectifier 650, resistor 651 having a resistance, say of 5000 ohms, conductor 652, through the winding of relay 6–CRH, resistor 631, to source 632 of negative potential of 24 volts, to attempt to operate relay 6–CRH, but this is to no avail inasmuch as tube 6–CRH′ has been fired due to the received character signal which is not a "carriage return" signal, and the current from source 714 is shunted at connection point 653 over a path extending through varistor-rectifier 637, main anode-cathode of tube 6–CRH′. source 654 at negative potential of 90 volts.

Associated with duration of character connection point 707 to which the path of the main anode-cathode circuit of tube 6–CRH′ is connected, is relay 7–NP which during the activated condition of the SOTUS unit, applies a positive potential of about 65 volts from potentiometer 719 to connection point 707 during the reception of the five selecting impulses and pulse No. 6 of each signal, and then, after pulse No. 6 has occurred, momentarily changing the potential at connection point 707 to a negative potential of 24 volts, the change in potential being effected by relay 7–NP operating in response to pulse No. 6. The purpose of the change from positive potential of 65 volts to a negative potential of 24 volts is to deionize tube 6–CRH′ after each firing at the end of each character signal of the address code. Accordingly, as long as a "carriage return" signal is not received during the activated condition of the SOTUS unit, tube 6–CRH′ fires during the reception of the five selecting impulses of each incoming character signal and the positive potential of 130 volts from source 714 is applied to connection point 718 during the reception of pulse No. 6 of the character signal. Shortly after the pulse No. 6 occurs the change from positive potential of 65 volts to a negative potential of 24 volts is effected to extinguish tube 6–CRH′.

When the "carriage return" signal is received, the five selecting impulses being space, space, space, mark and space, the right-hand triode of each of tubes 4–T1, 4–T2 and 4–T3 will become non-conducting, the left-hand triode of tube 4–T4 will become non-conducting, and the right-hand triode of tube 4–T5 will become non-conducting. Accordingly, current from source 401 of positive potential of 130 volts will be applied in turn to conductors 1–MARK, 2–MARK, 3–MARK, 4–SPACE and 5–MARK to which none of neon lamps 424 to 428, inclusive, is connected, and tube 6–CRH will not be fired. At the end of the reception of the "carriage return" signal its pulse No. 6 from connection point 653 causes positive potential of 130 volts at source 714 to be applied to the winding of relay 6–CRH which operates and the SOTUS unit therefore becomes deactivated.

*The long pulse, short pulse and duration-of-character signal circuits*

The long pulse circuit is one which provides a relatively long (10 milliseconds) pulse of positive potential of 130 volts immediately after the pulse No. 6 of each incoming character signal is received during the activated period of the SOTUS unit. The short pulse circuit is that which provides the pulse No. 6 of each character signal, the pulse being of positive potential of about 100 volts and of about 5 milliseconds duration. The duration-of-character signal circuit is one which applies from potentiometer 719 a positive potential of about 65 volts to connection point 707 during an interval comprising the selecting period of an incoming character signal and the duration of the pulse No. 6, and momentarily changes the potential to about 24 volts negative after the occurrence of the pulse No. 6.

All of the above-mentioned circuits are controlled from the pulse No. 6 connection point 725 which is connected to the plate of the right-hand triode of tube 2–V6–16 in the regenerative repeater. The voltage on the plate of the right-hand triode of tube 2–V6–16 is of a positive potential of about 130 volts during the steady, or normal, marking condition of the repeater, and changes to a positive potential of about 30 volts during the reception of the selecting impulses of a signal and the pulse No. 6 generated a half pulse interval after the beginning of the stop pulse. Thus a positive voltage change of about 100 volts occurs at the time of occurrence of the pulse No. 6 after each code signal combination, and a negative change occurs at the beginning of each code signal due to the normally non-conducting right-hand triode of tube 2–V6–16 becoming conducting during the reception of the start impulse of the character signal in the repeater. No use is made of this negative change.

The positive change in potential of about 100 volts is applied to a path extending over conductor 201 to connection point 725 where it divides over two parallel paths, one of which extends through condenser 711, varistor-rectifier 712, resistor 713 having a resistance, say of 0.68 megohm, to the grid of tube 7–T6, and the other of which extends through condenser 701, varistor-rectifiers 702 and 703 to short pulse, or pulse No. 6, connection point 704. At point 704 the circuit path again divides into several parallel paths, one path extending to potentiometer point 705 which furnishes a steady state positive voltage of 53 volts, and then over conductor 706 for furnishing pulse No. 6 to tubes 6–FIG′ and 6–CRH′ as hereinbefore described, and the other paths, each extending through the contact and lower armature of the relay of each of the individual address code circuits of Fig. 7 as will be hereinafter described. The surge due to the change in positive potential of over 100 volts whereby the pulse No. 6 is caused to occur is used to activate vacuum tube 7–T6 and fire certain gas tubes such as tubes 6–FIG′, 6–CRH′ and the tubes associated with the relays that establish the connections of the subscribers' teletypewriters to the line.

When the right-hand triode of tube 2–V6–16 of the regenerative repeater goes back to its conducting condition at the beginning of the start impulse of a signal incoming at the regenerative repeater, the impulse of negative potential that would ordinarily be produced at connection point 704 by this action is suppressed by the action of the two varistor-rectifiers 702 and 703, in series connection, which present a high impedance to current flowing in a negative direction at connection point 725. Tube 7–T6 is normally non-conducting due to the negative potential bias of 12 volts on its grid, the bias being furnished from the potentiometer comprising source 760 of negative potential of 24 volts and resistors 731 and 732 each having a resistance of 4.7 megohms, and relay 7–LP is in a released condition. When the positive change in potential occurs at the plate of the right-hand triode of tube 2–V6–16 this change which produces the pulse No. 6, is applied to the grid of tube 7–T6 to drive tube 7–T6 conducting for several milliseconds, thus operating relay 7–LP. Relay 7–LP, upon operating, closes at its armature and contact a circuit extending from source 714 of positive potential of 130 volts, condenser 733 having a capacitance of 0.001 microfarad, resistor 713 having a resistance, say of 0.68 megohm, to the grid of tube 7–T6, and the positive pulse applied to this grid from source 714 holds tube 7–T6 conducting for a few milliseconds after the positive potential of pulse No. 6 received over conductor 201 has been dissipated by the charging of condenser 711. The circuit closed by the armature and contact of relay 7–LP and extending a pulse to the grid of tube 6–T6 serves to extend the operation of relay 7–LP for a few more milliseconds than could be obtained conveniently from the operation of the right-hand triode of tube 2–V6–16 in the regenerative repeater. Also, relay 7–LP upon operating, places a pulse of a low resistance positive potential of 130 volts on connection point 653 whereby relay 6–CRH is operated in response to a "carriage return" signal, the circuit path being traceable from source 714, armature and contact of relay 7–LP, conductor 715, varistor-rectifier 650, resistor 651, connection point 653, conductor 652, through the winding of relay 6–CRH, resistor 631, to source 632 of negative potential of 24 volts. Another circuit path closed by the operation of relay 7–LP extends through varistor-rectifier 734, connection point 735, over two parallel paths, one extending through condenser 736 to ground to charge the condenser, and the other through resistor 737 having a resistance, say of 18,000 ohms, through the upper and lower windings, in series, of relay 7–NP, to ground whereby relay 7–NP operates. Condenser 736 serves to hold relay 7–NP operated a few milliseconds after relay 7–LP has released.

Relay 7–NP upon operating, changes the voltage on the duration-of-character connection point 707 from a positive potential of about 65 volts to a negative potential of 24 volts. In this way relay 7–NP is used to change the voltage on the plates of several of the cold cathode tubes such as tube 6–CRH′ and the address code registering tubes, such as tube 7–AB′ from positive potential of 65 volts to a negative potential of 24 volts to extinguish those tubes which have fired during the reception of a character signal. Since the positive potential of 130 volts from source 714 is also applied to the plates of these cold cathode tubes the negative potential of 24 volts from source 738 is subordinated to the positive potential of 130 volts from source 714 while relay 7–LP is operated. It is necessary therefore to have relay 7–NP operated a few milliseconds after relay 7–LP releases to provide for extinguishing the operated cold cathode tubes, and condenser 736 delays the release of relay 7–NP.

*Tube and code relay circuits*

After the SOTUS unit is activated, it is desired to have the proper two-character code signals that may be transmitted into the SOTUS unit, operate one or more switching relays which will connect corresponding teletypewriters to the line circuit. Relay 7–AB will respond to the two-character code signals for letters A and B, a corresponding relay in block 739 will respond to another pair of character code signals, such as the signals for letters C and D, and at a certain one of the stations where lost messages are to be recorded as hereinbefore described, there is provided a corresponding relay in each of a plurality of additional address code circuits respectively assigned to the teletypewriters located at all the other stations in the system. The address code circuits for the teletypewriters located at other stations although also provided at their respective stations, are provided at a particular station for recording messages whose address codes are garbled in transmission. Two of these additional address code circuits are indicated in Fig. 7 by block 755 which represents the circuits for the signals for letters E and F and block 756 which represents the circuits for the signals for letters G and K. The teletypewriter normally assigned to respond to the signals for letters E and F is assumed to be located at one of the other stations and that assigned to respond to the signals for letters G and H is assumed to be located at another of the other stations in the system.

The equipment provided for recognizing each two-character address code comprises a relay, a tube and two banks of neon lamps. As hereinbefore stated, relay 7–AB and tube 7–AB′ are for one two-letter code which is assumed herein to be the code AB. The two banks of neon lamps consist of lamps 501 to 505, inclusive, for the signal for letter A and lamps 506 to 510, inclusive, for the signal for letter B. For the letter A the code is mark, mark, space, space, space, and the twin triode tubes of the selection circuit operate as follows: The left-hand triode of each of tubes 4–T1 and 4–T2 and the right-hand triode of each of tubes 4–T3, 4–T4 and 4–T5 becomes non-conducting and raises the potential in each of the conductors 1–SPACE, 2–SPACE, 3–MARK, 4–MARK and 5–MARK, and since none of lamps 501 to 505, inclusive, is connected to any of these conductors, no lamp of lamps 501 to 505, inclusive, receives a voltage pulse and therefore none becomes lighted. For the letter B the code is mark, space, space, mark and mark, and the left-hand triodes of tubes 4–T1, 4–T4 and 4–T5 and the right-hand triodes of tubes 4–T2 and 4–T3 become non-conducting to cause a voltage pulse in each of conductors 1–SPACE, 2–MARK, 3–MARK, 4–SPACE and 5–SPACE, and since none of lamps 506 to 510, inclusive, is connected to any of these conductors, no lamp of the "B" group becomes operated. Therefore, the lamps of each group, that is, the group for the signal for the letter A and the group for the signal for the letter B are so cross-connected that no impulse of the signal for either letter A or B is applied to the control electrode of tube 7–AB′ and the tube cannot fire in response to the signals for the letters A and B. These cross-connections are arranged in a manner similar to those described hereinbefore for the signals respectively corresponding to "Figures," "H" and "carriage return" in that no lamp of a group passes current and becomes operated in response to an impulse of its own signaling combination.

During the activated condition of the SOTUS unit, when relay 7–LP connects at its armature and contact source 714 of positive potential of 130 volts, another circuit path is energized extending through varistor-rectifier 740 and resistor 741 having a resistance, say of 5000 ohms, through the winding of relay 7–AB, resistor 742 having a resistance, say of 1200 ohms, to source 743 of a negative potential of 24 volts, this connection as hereinbefore described being established immediately after the reception of pulse No. 6 of each character signal. The winding of relay 7–AB is also connected in a path extending through varistor-rectifiers 745 and 744 to the main anode of tube 7–AB′, over which path the positive potential of source 714 is applied to that anode of tube 7–AB′. The main anode of tube 7–AB′ is also connected through resistor 764 having a resistance, say of 0.68 megohm, to the "duration-of-character" connection point 707 whereat the voltage for the duration of the character is held at a positive potential of 65 volts but is changed to a negative potential of 24 volts after the receipt of pulse No. 6 at the termination of the character signal.

Should letter A be used in combination with letter B to furnish the address code for a particular station or teletypewriter, it is provided herein that the selecting circuit established by the signals for address code AB would terminate at the contact of a relay such as relay 7–AB and a description of the functions performed by these two signals with respect to this relay will now be given. It is first important to point out what happens at relay 7–AB when the incoming signal is not for the letter A, but for some other letter other than A or B. Should the incoming signal not be for the letter A, tube 7–AB′ would fire on the same principle as that described hereinbefore for tube 6–FN′. One of the selecting pulses of the signal for any of the other letters usually used in teletypewriter address codes will raise the potential of one of conductors 1–SPACE, 1–MARK, etc., which is connected to one of lamps 501 to 505, inclusive, causing a current flow in a circuit path extending through one or more of the lamps, bus conductor 511, conductor 513, back contact and outer upper armature of relay 7–AB, resistor 748 having a resistance, say of 0.68 megohm, control electrode-cathode of tube 7–AB′, to source 753 of negative potential of 40 volts to cause tube 7–AB′ to fire, inasmuch as there is a positive potential of 65 volts applied to the main anode of tube 7–AB′ for the duration of the character, that is, during the selection period of a character signal and the time of the No. 6 pulse, from potentiometer 719. Any one of the selecting impulses of the signal for such letter other than the letter A causes tube 7–AB′ to ionize, and the positive potential of 65 volts applied through resistor 764 from the armature of relay 7–NP will sustain tube 7–AB′ in its ionized condition until shortly after pulse No. 6 occurs, at which time, the operation of relay 7–NP in response to the operation of relay 7–LP, will connect the negative voltage of 24 volts from source 738 to cause tube 7–AB′ to become extinguished. Directly after the No. 6 pulse of each character signal is received and before the tube is extinguished, relay 7–LP will apply a positive potential of 130 volts from source 714 to varistor-rectifier 740 and resistor 741 associated with the winding of relay 7–AB, but since the tube is in a fired condition at this time all current passing through varistor-rectifier 740 and resistor 741 would flow through varistor-rectifiers 745 and 744, main anode cathode of tube 7–AB′ to source 749 of negative potential of 90 volts and the relay 7–AB will not become operated.

When the signal for letter A is received no selecting impulse is effective to cause current to flow through any of lamps 501 to 505, inclusive, and tube 7–AB′ consequently is not caused to fire. When relay 7–LP operates after the No. 6 pulse, relay 7–AB will become operated. Relay 7–AB upon operating, closes at its inner upper armature and front contact a locking circuit for itself traceable from source 750 of positive potential of 130 volts, inner upper armature and front contact of relay 7–AB, resistor 751 having a resistance, say of 22,000 ohms, through the winding of relay 7–AB, resistor 742 having a resistance, say of 1200 ohms, to source 743 of negative potential of 24 volts. The parallel circuit path extending through resistor 752 having a resistance, say of 5000 ohms, serves to increase the potential at the left-hand side of the winding of relay 7–AB to a higher positive value than it would be without this path. Also, relay 7–AB upon operating, transfers the control anode of tube 7–AB′ from the bank of neon lamps 501 to 505, inclusive, to the bank of lamps 506 to 510, inclusive, associated with the signal for letter B.

If the incoming signal following that for letter A is not for letter B, tube 7–AB′ will fire inasmuch as a selecting impulse of the signal for any other of the teletypewriter letters generally used in address codes than will cause current to flow through one of lamps 506 to 510, inclusive, in a circuit path traceable over bus conductor 512, conductor 514, front contact and outer upper armature of relay 7–AB, resistor 748, to source 753 of negative potential, and there being at the time a positive potential of 65 volts applied from the "duration-of-character" connecting point 707, tube 7–AB′ fires. Since the main anode of tube 7–AB′ is connected at this time to the positive, or right-hand, side of the winding of relay 7–AB which is in an operated condition, the relay is shunted and therefore releases. Tube 7–AB′ will still be ionized when relay 7–LP operates at the end of the character signal but the connection of source 714 of positive potential of 130 volts to the winding of relay 7–AB will not reoperate relay 7–AB due to the shunt effect of the ionized tube 7–AB′.

Should the character signal following that for letter A be for letter B, tube 7–AB′ would not become ionized and relay 7–AB would not be released. Since as hereinbefore stated, no lamp of lamps 506 to 510, inclusive, will pass a current pulse in response to the signal for letter B, no pulse is applied to the control electrode of tube 7–AB′ and consequently the tube cannot become ionized at this time, the control element being normally biased by a negative potential of 40 volts applied by source 753. Relay 8–CA would become operated at the time of occurrence of the pulse No. 6 following the signal for letter B, since pulse No. 6 would be applied over a circuit path traceable from connecting point 704 over parallel paths, one extending over conductor 728, front contact and lower armature of relay 7–AB, conductor 754, resistor 801 having a resistance, say of 0.68 megohm, to the control electrode of tube 8–CA′ and tube 8–CA′ becomes ionized to operate relay 8–CA; and another path extending through resistor 763 having a resistance, say of 1000 ohms, varistor-rectifiers 746 and 747, to the main anode-cathode of tube 7–AB′ to source 749 of negative potential of 90 volts. The latter path is used in the event that relay 7–AB is slow in releasing, to shunt the pulse No. 6 away from a subscriber's switching relay control tube, such as tube 8–CA′, by bridging from the path of conductor 728 to the main anode of the associated code tube, in this case tube 7–AB′, so that the instant the tube fires, a path is provided which will dissipate pulse No. 6 through the discharge path of tube 7–AB′. The importance of the second of the parallel paths will be set forth more fully hereinafter.

It will be understood that additional code circuits similar to that for the address code AB are provided at the local station shown in the drawings, block 739 representing diagrammatically the code circuit for the address code CD for the teletypewriter located at the local station. Block 755 represents diagrammatically the code circuit for the address code EF for a teletypewriter located at another station in the system, and block 756 represents diagrammatically the code circuit for the address code GK for a teletypewriter located at still another station. The purpose of these blocks will be hereinafter described. As hereinbefore described the selecting principle involves a relay associated with the address code, which operates for the first letter of the address code and releases if the following letter is not the proper one or remains operated if the following signal is the proper one. Relay 7–LP, upon operating, applies a positive potential of 130 volts to all address code relays in parallel but only a code relay whose associated bridging cold cathode tube has not been fired during the time when the character signal is being received, will be operated whereby pulse No. 6 causes the cold cathode tube, such as tube 8–CA′, to fire, and the switching relay associated with such tube operates to connect the desired teletypewriter.

*Output and subscriber's relay circuit*

The output and subscriber's relay circuit at each station comprises an output, or message repeating, relay and one relay for each of the teletypewriters located at the station. However, at one station only, say the local station shown in the drawings, there is an additional relay such as relay 8–CX arranged to operate each time a proper address code is received for a teletypewriter at any one of the other stations. There is also provided at the local station only as hereinbefore stated, an address code circuit for each of the teletypewriters located at each of the other stations in the system. Should an address code be garbled during transmission so that the message would not be properly routed, relay 8–CX would therefore not operate and a pulse occurring when the SOTUS unit is deactivated by the "carriage return" signal received immediately following the address code signals, would cause tube 8–CA′ to fire and thereby operate relay 8–CA. Relay 8–CA upon operating, would connect teletypewriter 8–CA″ to the output circuit of output relay 8–OP to receive the lost message. Relay 8–OP upon operating, serves to change the high impedance signals in the output of the regenerative repeater to low impedance signals for application to a subscriber's loop or teletypewriter circuit operating on 60 milliamperes. At the local station, relays 8–CA and 8–CB serve to respectively connect teletypewriters 8–CA″ and 8–CB″ to the output circuit of the output relay 8–OP. Also each of tubes 8–CA′ and 8–CB′ may be controllable by two or more address code circuits, such as shown in Fig. 7, responsive to different address codes to effect the selection of its associated teletypewriter to receive a message, as indicated by the multiple connections to the control electrode of each of tubes 8–CA′ and 8–CB′. Therefore, relay 8–CX is arranged to operate in response to all address codes used on the line circuit to which the SOTUS unit at the local station is connected, except in response to the address codes for the teletypewriters at the local station, in this case, teletypewriters 8–CA″ and 8–CB″.

Should an address code be garbled in transmission it would not be received by its corresponding address code circuit at the proper station, or in the local station, and when the SOTUS unit at the local station is restored to its deactivated condition in response to the "carriage return" signal, the pulse occurring due to the reoperation of relay 6–CRH will be transmitted over the circuit extending from source 614 of positive potential of 130 volts, inner upper armature and front contact of relay 6–CRH, conductors 615 and 655, outer lower armature and back contact of each of relays 8–CX, 8–CB and 8–CA, in series, conductor 803, resistor 804, having a resistance, say of 2.2 megohms, to the control anode of tube 8–CA′, and tube 8–CA′ will fire to thereby operate relay 8–CA. Relay 8–CA upon operating, connects teletypewriter 8–CA″ represented diagrammatically by block 805 to a circuit traceable over conductor 806, upper armature and front contact of relay 8–CA, conductors 807 and 808, right-hand contact and armature of output relay 8–OP, to ground whereby relay 8–OP upon following the message signals repeats them to the teletypewriter 8–CA″. The message signals are regenerated by the regenerative repeater and transmitted over a circuit traceable from the plate of the output, or left-hand, triode on tube 2–V1–11, conductor 205, control electrode-cathode of output tube 8–OP′, to ground. Tube 8–OP′ amplifies the regenerated signals for transmission to relay 8–OP. From information contained in the misdirected message recorded on teletypewriter 8–CA″, it may be determined to which teletypewriter at another station the message should have been transmitted, and the message accordingly may be retransmitted to the desired teletypewriter.

If the address code for a teletypewriter, at another station on the line circuit, is properly received, relay 8–CX will be operated and the pulse occuring when the SOTUS unit at the local station is restored to its deactivated condition, is prevented from being applied to the control electrode of tube 8–CA″. Therefore, tube 8–CA′ does not fire and relay 8–CA does not operate at this time. Relay 8–CX operates when tube 8–CX′ fires over a circuit traceable from the pulse No. 6, conductor 201, condenser 701, varistor-rectifiers 702 and 703, conductor 728, conductor 758, front contact and lower armature of the address code relay for the desired teletypewriter at the distant station, say in this case the relay in address code circuit EF represented by block 755, conductor 759, resistor 802, having a resistance, say of 0.68 megohm, to the control electrode of tube 8–CX′. Tube 8–CX upon firing, causes relay 8–CX to operate. Relay 8–CX upon operating, opens at its outer lower armature and back contact a circuit path for ionizing tube 8–CA′ and since tube 8–CA′ is not ionized at this time, relay 8–CA cannot operate. Therefore, the impluse occurring at the time when the SOTUS unit is restored to its deactivated condition cannot be applied to the control electrode of tube 8–CA′, since the circuit path is open at the outer lower armature of relay 8–CX. The operation of relay 8–CX indicates that the message for the desired teletypewriter at the distant station is properly routed to its destination.

As hereinbefore stated in the description of the operation of the individual address code circuit, particularly when the proper address code is received, the relay in the address code circuit remains operated on the reception of the second character signal of the address code and permits pulse No. 6 received over conductor 201 to be transmitted over the front contact and lower armature of the relay, such as relay 7–AB. Since the control electrode of tube 8–CA′ is connected to the lower armature of relay 7–AB, tube 8–CA′ will be fired to operate relay 8–CA.

The situation is the same for relays 8–CB and 8–CX, the control electrodes of tubes 8–CB′ and 8–CX′ respectively associated with these relays, being connected to the lower armatures of the individual address code circuit relays arranged to operate relays 8–CB and 8–CX. Relay 8–CB is operated when the relay in the individual address code circuit CD is operated and relay 8–CX, when the relay in any of the address code circuits for the teletypewriters located at the other stations in the system, is operated.

When one or more of tubes 8–CA′, 8–CB′ and 8–CX′ are fired the tubes remain ionized until relay 6–CRH is operated to deactivate the SOTUS unit. At this time, the ground at the lower armature of tube 6–CRH is connected to a circuit traceable over conductor 656, lower armatures and front contacts of the operated relays of relays 8–CA, 8–CB and 8–CX, to the main anodes of the tubes 8–CA′, 8–CB′ and 8–CX′ which are ionized and the tubes, accordingly, are immediately extinguished. The operated relays are locked in operated condition by the same ground in the circuit traceable over conductor 656, to three separate sources of positive potential of 130 volts. The path for locking relay 8–CA extends over conductor 815, inner lower armature, front contact and winding of relay 8–CA to source 816; that for locking relay 8–CB extends over conductor 817, inner lower armature, front contact and winding of relay 8–CB to source 818; and that for locking relay 8–CX extends over the inner lower armature, front contact and winding of relay 8–CX, conductor 809, resistor 761 having a resistance, say of 2000 ohms, to source 762. When the SOTUS unit is activated again in response to the "Figures H" signals, the release of relay 6–CRH causes ground to be removed from the front contact at the lower armature of the relay and therefore the one or more relays of relays 8–CA, 8–CB and 8–CX that may have been locked operated, release inasmuch as the tube or tubes associated with such relays will not reionize at this time.

Tube 8–OP′ has its control electrode connected to the output of the regenerative repeater, that is, to conductor 205 which extends to the cathode of the left-hand triode of tube 2–V1–11 where the mark impulse is of positive potential, say of 40 volts, and the space impulse is of negative potential, say of 40 volts. Tube 8–OP′ is therefore conducting during the reception of a mark impulse and not conducting during a space impulse, and relay 8–OP which is connected to the main anode of tube 8–OP′ will be in its operated condition during the marking condition of the regenerative repeater output. The teletypewriter represented by block 805 which is arranged to be switched off and on the output circuit of relay 8–OP by the upper armature of relay 8–CA is connected on one side to conductor 806 and on the other side to variable resistor 810 having a resistance, say of 2000 ohms, the resistor being connected at its other side to source 811 of positive potential of 130 volts. In a similar manner a teletypewriter represented by a block 812 is arranged to be switched off and on the output circuit of relay 8–OP by the upper armature of relay 8–CB. The 60-milliampere current normally flows to ground at the upper armatures of both relays 8–CA and 8–CB to maintain the printer magnet of each of the teletypewriters 805 and 812 operated during the idle period. However, when one of relays 8–CA and 8–CB is locked operated in response to the address code signals, the teletypewriter associated with the operated relay is capable of responding to the repeater output.

Relay 8–CX normally performs no connecting function directly but is arranged when it is not operated to close as hereinbefore stated, a path extending from source 614 of positive potential of 130 volts when relay 6–CRH is operated as during the deactivated condition of the SOTUS unit, over conductors 615 and 655, lower armature and back contact of each of relays 8–CX, 8–CB and 8–CA to the control electrode of tube 8–CA′ whereby the tube 8–CA′ is ionized to operate relay 8–CA. This path is not available when relay 8–CX is operated and therefore relay 8–CA′ is prevented from operating. The control electrode of tube 8–FA is also connected to the path extending over the lower armature and back contact of relay 8–CX at the same time as the control electrode of tube 8–CA′ and tube 8–FA becomes ionized simultaneously with tube 8–CA′.

When relay 8–CX does not operate due to the address code for any teletypewriter at another station in the system being garbled in transmission, tubes 8–CA′ and 8–FA become ionized at the same time, and assuming that tube 8–FA is so located at the station that it is visible to an attendant, tube 8–FA will serve as an indication that the teletypewriter 805 associated with relay 8–CA is connected to the output of the regenerative repeater, not as a result of reception of address code AB which also causes the operation of relay 8–CA, but as a result of an address code for one of the other teletypewriters at another station being garbled in transmission. In addition to the visual indication another audible or visual alarm signal may be provided by connecting an alarm device represented by block 819 in the cathode circuit of tube 8–FA.

In connection with the operation of an address code relay, such as relay 7–AB, the first character signal as hereinbefore described, operates the relay and the second character signal, should it not be the proper one, causes the relay to release. However, the fact that the second character signal is not the proper one may not be recognized until the fifth selecting impulse of the second character signal is received. This condition is presented when the first four selecting impulses of the character signal are identical with the first four selecting impulses of the proper character signal, the only difference being in the fifth selecting impulse. In such event, it is necessary for relay 7–AB to release in 18 milliseconds when 75 word-per-minute service is furnished, in order that the circuit path for pulse No. 6 which extends over the lower armature and front contact of the relay, will be opened before pulse No. 6 occurs. Otherwise, if relay 7–AB were slow in releasing, pulse No. 6 would occur before the relay released and pulse No. 6 would be transmitted through to the control electrode of the switching control tube, in this case tube 8–CA′, to connect teletypewriter 805. There are many types of relays available which will release reliably in less than 18 milliseconds, or even less than 13 milliseconds which would be the maximum release interval at a transmission speed of 100 words per minute. However, in order to eliminate the necessity for depending upon the release of the relay in those short intervals, the circuit has been arranged to prevent pulse No. 6 from interfering with the release of the code circuit relay by bridging from the pulse No. 6 path, a shunt path comprising in the case of address code AB, resistor 763, varistor-rectifiers 746 and 747 to the main anode of the associated tube, such as tube 7–AB′ so that at the instant when tube 7–AB′ fires a path is provided which will shunt pulse No. 6 away from the control electrode of the subscriber's switching relay tube, in this case tube 8–CA′ which is fired to normally connect teletypewriter 805 in response to the signal of address code AB. Thus the avoidance of improper selection of a teletypewriter is dependent directly and firstly upon activation of tube 7–AB′ rather than upon release of relay 7–AB. The operation of a code relay such as relay 7–AB starts directly in response to the pulse No. 6 of the first of two character signals and must be completed by the mid-point of the first selecting impulse of the following character signals in order that the control electrode of the tube of the individual address code circuit will be connected to the second bank of neon lamps to pick up a possible impulse if the following character signal produces a pulse during selecting impulse No. 1. This interval of time is about 43 milliseconds at 75-speed service of transmission.

*Pulse circuit*

The selecting pulses Nos. 1 to 5 and pulse No. 6 are obtained from the regenerative repeater, pulse No. 6 as hereinbefore stated being obtained directly from the plate of the right-hand triode of tube 2–V6–16. Selecting pulses Nos. 1 to 5 which are impressed on the grids of the triodes of each of tubes 4–T1, 4–T2, 4–T3, 4–T4 and 4–T5 as hereinbefore described, are obtained from the plates of the counting tubes 3–V7–17, 3–V8–18 and 3–V9–19. Obtaining selecting pulses Nos. 1 to 5 requires equipment external to the SOTUS unit which for each selecting pulse comprises three small neon lamps, eight resistors and one condenser. The different pulses are obtained by connecting the equipment required for each of the five selecting pulses to the plates of the counting tubes 3–V7–17, 3–V8–18 and 3–V9–19. The equipment for each selecting pulse is mounted in a separate plug-in element to make it demountable and easily replaceable in case of trouble. Since this equipment is identical for the five selecting pulses, one replacement unit can be used to substitute for any one of the five sets of equipment. The first pulse plug-in unit produces selecting pulse No. 1 and is represented by dot-dash block 301 in Fig. 3, and it is this unit of equipment that is plugged into a suitable socket. Pulse plug-in unit Nos. 2, 3, 4, and 5 respectively produce selecting pulses Nos. 2 to 5 and are represented by dot-dash blocks 302, 303, 304 and 305. These five units are identical. Pulse plug-in unit No. 301 comprises neon lamps 306, 307 and 308, condenser 309 having a capacitance, say of 0.003 microfarad, and resistors 310, 311, 312, 313, 314, 315, 316 and 317 each having a resistance, say of 2.2 megohms. Pulse unit No. 1 is shown connected through resistor 314 to the plate of the left-hand triode of tube 3–V7–17, through resistor 315, to the plate of the right-hand triode of tube 3–V8–18 and through resistor 316, to the plate of the left-hand triode of tube 3–V9–19 so that selecting pulse No. 1 is produced from the counting circuit. The voltage at the plate of each triode of tubes 3–V7–17, 3–V8–18 and 3–V9–19 is at a positive potential of about 130 volts when the triode is non-conducting and at a negative potential of about 30 volts when the triode is conducting. The interconnection between tubes 3–V7–17, 3–V8–18 and 3–V9–19 of the counting circuit necessary for the counting function, is not shown on the drawing but reference for this information is made to the patent application of B. Ostendorf, Jr. supra.

The operation of the counting circuit is such that the two triodes of each tube are always in opposite conditions, one being conducting and the other being non-conducting, and vice versa. Normally, the left-hand triode of each of tubes 3–V7–17, 3–V8–18 and 3–V9–19 is non-conducting and the right-hand triode of each is conducting. The plate of the left-hand triode of tube 3–V7–17 is coupled to the grids of the two triodes of tube 3–V8–18 so that when the left-hand triode of tube 3–V7–17 goes from its normal, or non-conducting, condition to a conducting condition to produce a voltage change in a negative direction, tube 3–V8–18 is flipped from the condition of left-hand triode non-conducting and right-hand triode conducting to the reverse condition.

When the left-hand triode of tube 3–V7–17 goes non-conducting no change is caused to the condition of tube 3–V8–18. The same relationship applies between the left-hand triode of tube 3–V8–18 and the two triodes of tube 3–V9–19, that is, when the left-hand triode of tube 3–V8–18 becomes conducting, tube 3–V9–19 is flipped to its opposite condition. Both grids of each tube together receive positive or negative pulses. Positive pulses have no effect, but negative pulses cut off the triode section that is then conducting, and the mutual interconnections between the sections cause the other section to become conducting.

The grids of the two triodes of tube 3–V7–17 are connected to the output, or plate of the right-hand triode, of tube 2–V4–14 of the oscillator, or timing and pulsing, circuit and receive therefrom, once the oscillator is started by the start impulse of a signal incoming from the line circuit, seven complete cycles of current which are generated by the oscillator in response to each incoming character signal. The counting circuit counts eight pulses for each signal which it receives from the timing and pulsing circuit (tubes 2–V4–14, 2–V5–15 and 2–V6–16). Hereinbefore it was stated that when the left-hand triode of oscillator control tube 2–V6–16 is cut off at the start of each incoming signal as a result of the start element pulse, the increase in voltage at the plate of the left-hand triode of tube 2–V6–16 causes a positive pulse to be applied to the grid of the left-hand triode of tube 3–V7–17 to make the left-hand triode of tube 3–V7–17 conducting whereby the right-hand triode of tube 3–V7–17 becomes non-conducting. Thereafter, negative pulses alternating with positive pulses are applied to the grids of both triodes of tube 3–V7–17. The positive pulses have no effect on the counting circuit but each negative pulse causes the triodes of tube 3–V7–17 to flip to its opposite conditions. Thus the counting circuit counts the first positive pulse and the seven negative pulses which follow. As soon as the eighth pulse (seventh negative pulse) is counted the oscillator stops.

As hereinbefore stated, prior to the reception of an incoming signal the tubes of the counting circuit have their left-hand triode in a non-conducting condition and a right-hand triode in a conducting condition. The reception of the first pulse (positive) causes the left-hand triode of tube 3–V7–17 to become conducting; this change in voltage at the plate of the left-hand triode of tube 3–V7–17 in a negative direction causes the triodes of tube 3–V8–18 to flip to their opposite conditions. The change of the left-hand triode of tube 3–V8–18 from a non-conducting condition to a conducting condition will accordingly cause the triodes of tube 3–V9–19 to flip to their opposite conditions. Thus on the first pulse the triodes of the three tubes have respectively flipped to their opposite conditions.

In response to the second pulse (negative) the left-hand triode of tube 3–V7–17 flips back to a non-conducting condition and the right-hand triode accordingly becomes conducting again. This change in the left-hand triode of tube 3–V7–17 is in the direction of conducting to non-conducting which does not cause the triodes of tube 3–V8–18 to flip to opposite conditions. Consequently, the triodes of tube 3–V9–19 do not flip to opposite conditions.

In response to the third pulse (negative) the left-hand triode of tube 3–V7–17 becomes conducting and whereby the right-hand triode becomes non-conducting. The change of the left-hand triode to conducting condition causes the triodes of tube 3–V8–18 to flip to opposite conditions and the change in condition of the left-hand triode of tube 3–V8–18 has no effect on the triode of tube 3–V9–19 and the triodes of tube 3–V9–19 do not change their conditions. The remaining five pulses (negative) continue to cause the triodes of tube 3–V7–17 to flip each time a pulse is received on the grids from the right-hand triode of tube 2–V4–14, while the triodes of tube 3–V8–18 flips on only every second, or alternate one, of these pulses, and the triode of tube 3–V9–19 flips on every fourth pulse as indicated in the following table.

| Columns | 1 | 2 | 3 | 4 | 5 | 6 | 7 |
|---|---|---|---|---|---|---|---|
| Tubes | 2–V7–17 | | 2–V8–18 | | 2–V9–19 | | Corresponding Pulse in Output of Repeater |
| Triodes | L [1] | R [1] | L | R | L | R | |
| Before start of signals | N [2] | C [2] | N | C | N | C | |
| First pulse (positive) | C | N | C | N | C | N | |
| Second pulse (negative) | N | C | C | N | C | N | 0 (start). |
| Third pulse (negative) | C | N | N | C | C | N | 1 (sel.). |
| Fourth pulse (negative) | N | C | N | C | C | N | 2 (sel.). |
| Fifth pulse (negative) | C | N | C | N | N | C | 3 (sel.). |
| Sixth pulse (negative) | N | C | C | N | N | C | 4 (sel.). |
| Seventh pulse (negative) | C | N | N | C | N | C | 5 (sel.). |
| Eighth pulse (negative) | N | C | N | C | N | C | 6 (stop). |

[1] L=left-hand triode; R=right-hand triode.
[2] N=non-conducting; C=conducting.

On reception of the eighth pulse, the count circuit has returned to the configuration that it had before the start of the character signal. The line circuit at this time is in a marking condition since the stop pulse of a signal is always marking, and the oscillator creating the pulses which were flipping tube 3–V7–17 will stop. It will restart upon the reception of another character signal and the counting action will then repeat. It was desired to obtain, for use in the SOTUS unit, a negative pulse at the mid-point of each selecting pulse of a character signal at the cathode of the output, or left-hand, triode of tube 2–V1–11 of the regenerative repeater. The negative pulses received from the oscillator (plate of right-hand triode of tube 2–V4–14) and listed in the above table, occur at these times. An examination of the above table will show that the occurrence of any of the negative oscillator pulses causes three of the triodes of the counting tubes 3–V7–17, 3–V8–18 and 3–V9–19 to become conducting and that it is never the same three triodes for more than one pulse of a code combination.

Since the plate voltage conditions of any combination of three of these triodes, all being conducting at the same time, represent the most negative conditions that can be obtained from those three triodes, the plate voltage conditions existing when any one or any two of the three are conducting must be more positive. Thus the change of the previous condition to the most negative represents a change in the negative direction, from which a negative short duration pulse can be obtained for timing operations in the SOTUS unit. The negative pulse for use at the mid-point of each selecting pulse is extracted from the operation of the counting circuit by means of its respective unit of the five external network units, hereinbefore described, referred to as plug-in units Nos. 1 to 5, respectively. Each network is connected to the plate of one triode of each of the counting tubes, the connections for the mid-point of selecting pulse No. 1 being made to the three triodes that become conducting at the mid-point of selector pulse No. 1, and so on for the remaining selecting pulses.

One external network for obtaining a negative output pulse is shown in detail in Fig. 3. The connections of the network in pulse unit No. 1 to the counting circuit, produce a negative pulse at the mid-point of selecting condition No. 1 in the output, or left-hand, triode of tube 2–V1–11 of the regenerative repeater. For selecting pulse No. 1 shown in column 7 of the above table, the corresponding pulse in the output of each of the counting tubes is identified in the table as the third pulse (negative). As shown in the table, the left-hand triode of tube 3–V7–17, the right-hand triode of tube 3–V8–18 and the left-hand triode of tube 3–V9–19 are conducting at the time of selecting condition No. 1 at the output of the regenerative repeater and the potentials at the plates of these triodes are accordingly reduced to become negative at this time. The connection of these plates to the pulse unit No. 1 are made through registors 314, 315 and 316, respectively, each having a resistance, say of 2.2 megohms, to prevent the circuit of the pulse unit No. 1 from affecting the operation of the counting circuit. The voltage at the junction point 318 of the three resistors 314, 315 and 316 assumes four different values, depending on how many of the three triodes to which the resistors are connected, are conducting at the time. These values are as follows:

| Triodes Conducting | Combined Voltages at Junction 318 of the Resistors |
|---|---|
| 0 | +130 volts. |
| 1 | +77 volts. |
| 2 | +24 volts. |
| 3 | −30 volts. |

The above combined voltages are applied through condenser 309 having a capacitance, say of 0.003 microfarad, to create pulses for use in the selection circuit. Each time one or more triodes changes from conducting to non-conducting, or vice versa, there will be a surge, or pulse, produced on the far side of the condenser from the common junction point 318. The polarity of this pulse will be the same as that of the direction of the voltage change that takes place at point 318. For example, if the voltage at point 318 changes from a positive potential of 130 volts to a positive potential of 77 volts, or a positive potential of 77 volts to a positive potential of 24 volts, or a positive potential of 24 volts to a negative potential of 30 volts, a negative pulse will be produced, through condenser 309. One such pulse involved with each of the above voltage changes will take place at the mid-point of each of the selecting pulses at the output of the regenerative repeater. This is because one of the three resistors 314, 315 and 316 is connected to tube 3–V7–17 which flips on each pulse from the plate of the right-hand triode on tube 2–V4–14 of the oscillator of the regenerative repeater and causes a voltage change each time. It is desired that for a given pulse circuit only one of the above negative surges be registered because it is desired to obtain a pulse with one only of each selecting pulse. Three of the four negative surges indicated above are suppressed by neon lamp 308 which is connected between the common junction point 318 and source 319 of a negative potential of 40 volts. Because of the presence of neon lamp 308 connected in this manner the voltage at the common point 318 cannot rise above a positive potential of about 20 volts, since neon lamp 308 causes a voltage drop of about 60 volts positive potential across the terminals when it is conducting. Because the voltage at the common point 318 cannot rise above a positive potential of about 20 volts, changes in voltage from a positive potential of 130 volts to a positive potential of 77 volts and a positive potential of 77 volts to a positive potential of 24 volts listed above, cannot take place, since during the time these voltages normally would have been present, the neon lamp was holding the voltage at a steady positive potential of 20 volts. Surges of current through the condenser 309 that would have taken place on these voltage changes are therefore eliminated. Thus only the voltage change from a positive potential of 24 volts to a negative potential of 30 volts, or actually from a positive potential of 20 volts to a negative potential of 30 volts will take place, this change occurring at a time all three triodes become conducting. As stated hereinbefore, any one combination of three triodes of tubes 3–V7–17, 3–V8–18 and 3–V9–19 becomes conducting only once during a character signal, and it is possible to find combination of three triodes which reach this state at the mid-point of each of the selecting pulses of the cathode of the output of tube 2–V1–11. Both triodes of tube 4–T1 which is connected to pulse unit No. 1 and associated with pulse No. 1 are, as hereinbefore stated, normally conducting, due to the voltage on the grids being positive with respect to the cathode voltage. The positive relation of the grid voltage to the cathode voltage is obtained by applying the cathode voltage to the grid of each of tubes 4–T1 to 4–T5 through a potentiometer in such a way that a voltage more positive than the cathode voltage is obtained for the grids. The potentiometer comprises source 408 of a negative potential of 130 volts, resistors 429, 430 and 431 having resistances, say of 350 ohms, 0.18 megohm and 1.0 megohm, respectively, the desired potential being taken at point 433 and impressed on conductor 434 to each of the five pulse units 301 to 305. The potential applied to pulse unit 301 for the first selecting pulse is impressed on a path extending over conductor 320, resistor 317 and then in parallel through resistor 311 and over conductor 321 to the grid of the left-hand triode of tube 4–T1, and through resistor 310 and over conductor 322 to the grid on the right-hand triode of tube 4–T1. The grid voltage is obtained in this way for the reason that the cathode voltage is dependent upon the amount of plate current flowing from source 401 in all five tubes 4–T1 to 4–T5, since this current flows in the common cathode resistor 429. This amount of current will vary with different tubes of tubes 4–T1 to 4–T5 and the actual cathode voltage will vary accordingly. By relating the grid voltage to the cathode voltage the result is obtained that as the cathode voltage varies, the grid voltage varies in the same manner, and always remains sufficiently more positive to keep these tubes normally in the conducting condition.

The negative pulse that appears on the lower plate of condenser 309 at the mid-point of the associated selecting pulse as hereinbefore described, is applied to both grids of tube 4–T1, and unless suppressed, will make each triode non-conducting and create a positive potential of 130 volts on the plate of each triode. It is desired that when the selecting pulse, that is, pulse No. 1, is a mark, a positive potential pulse of 130 volts on conductor 1–SPACE only is produced, and that when the selecting pulse is a space, a positive potential of 130 volts on conductor 1–MARK only is produced. This is obtained by preventing the negative pulse from being applied to the triode which it is desired to hold conducting for the duration of the pulse. The suppression of the proper negative pulse is attained by bridging the grid of the right-hand triode of tube 4–T1, over a path extending over the resistor 313, neon lamps 307 and 323, conductors 324 and 325, to the plate of the right-hand triode of tube 2–V2–12. Likewise, a bridging path is provided for the left-hand triode of tube 4–T1, the path extending over resistor 310, neon lamps 306 and 326, conductor 327, to the plate of the left-hand triode of tube 2–V2–12. The two triodes of tube 2–V2–12 are in the output circuit of the regenerative repeater and operate so that when the output pulse is a mark the left-hand triode is non-conducting and the right-hand triode is conducting and when it is a space, the conditions of the two triodes are interchanged. For the triode of tube 2–V2–12 that is non-conducting at any time, the voltage on the other side of the two neon lamps, such as lamps 306 and 326, cannot be more negative than a positive potential of about 10 volts; assuming that there is a voltage drop of about 120 volts across the two lamps in series and disregarding a small voltage drop in the resistors, such as either of resistors 206 and 208, each having a resistance of 0.15 megohm and included in the plate-cathode circuit of the triode of tube 2–V2–12. With the voltage on the other side of the two neon lamps from the plate-cathode of the triode of tube 2–V2–12 restricted from going more negative than a positive potential of about 10 volts, the negative pulse occurring on the lower plate of condenser 309 will be suppressed on this particular side and the associate triode of tube 4–T1 will not be cut off and no positive potential swing to about 130 volts will occur on the plate of such triode. On the other triode of tube 4–T1 the triode of tube 2–V2–12 thus associated will be conducting and the voltage at its plate will be of a negative potential of about 30 volts. The voltage on the other side of the two neon lamps from the latter plate can become as negative as a negative potential of 30 volts minus 120 volts, that is, as negative as a negative potential of 150 volts. The negative pulse on the lower plate of condenser 309 is thus not suppressed on this side and the positive potential pulse of 130 volts is produced at the plate of the triode of tube 4–T1.

As hereinbefore stated, the pulse circuits are the same for all of the selecting pulses, the obtaining of a particular pulse being determined by the connections of the three resistors connected to the plate of the proper counting tube of tubes 3–V7–17, 3–V8–18 and 3–V9–19, in pulse unit No. 1 these resistors being, those designated 314, 315 and 316. For pulse No. 2 the resistors corresponding to resistors 314, 315 and 316 for pulse No. 1, are respectively connected to the right-hand triode of tube 3–V7–17 as indicated by conductor 328, the right-hand triode of tube 3–V8–18 as indicated by conductor 329 and the left-hand triode of tube 3–V9–19 as indicated by conductor 330. For pulse No. 3 the corresponding resistors taken in the same order as stated in the previous sentence are respectively connected to the left-hand triode of tube 3–V7–17 as indicated by conductor 334, left-hand triode of tube 3–V8–18 as indicated by conductor 335 and the right-hand triode of tube 3–V9–19 as indicated by conductor 336. For pulse No. 4 the corresponding resistors are respectively connected to the right-hand triode of tube 3–V7–17 as indicated by conductor 334, left-hand triode of tube 3–V8–18 as indicated by conductor 335 and the right-hand triode of tube 3–V9–19 as indicated by conductor 336. For pulse No. 5 the corresponding resistors are respectively connected to the left-hand triode of tube 3–V7–17 as indicated by conductor 337, the right-hand triode of tube 3–V8–18 as indicated by conductor 338 and the right-hand triode of tube 3–V9–19 as indicated by conductor 339.

Although a particular embodiment of the invention is shown in the drawings and described in the foregoing specification, it will be understood that the invention is not limited to the specific embodiment, but is capable of modification, rearrangement and substitution of parts and elements without departing from the spirit of the invention.

What is claimed is:

1. In a telegraph system, a transmission channel and a station connected thereto, said station comprising a plurality of teletypewriters arranged for connection individually to said channel, means responsive to permutation code signals incoming over said channel for producing a timing pulse for each pulse of an incoming signal, a code controlled device, a network individual to each selecting pulse of a permutation code signal for combining a timing pulse with a selecting pulse, a selection circuit to which each of the combined pulses is applied in turn, a plurality of address code signal circuits arranged to receive the permutation code signals in groups from said selection circuit, means in each of said address code circuits for selecting one of said teletypewriters in response to a particular group of signals and preparing the selected teletypewriter for connection to said channel, and means in said code controlled device for producing a special pulse for each permutation code signal incoming over said channel for completing the connection of the selected one of said teletypewriters to said channel.

2. In a telegraph system, a transmission channel and a station connected thereto, said station comprising a plurality of teletypewriters arranged for connection individually to said channel, means for regenerating and repeating permutation code signals incoming over said channel, means in said regenerating means for producing timing pulses in response to each signal incoming over said channel, a permutation code signal controlled device, a network corresponding to each selecting pulse of a permutation code signal incoming over said channel for combining one of said timing pulses with a selecting pulse of a signal from said regenerating means, a selection circuit to which said combined pulses are applied in a sequential order, a plurality of address code signal circuits arranged to receive the permutation code signals in groups from said selection circuit to thereby prepare the respective teletypewriters of said plurality for connection to said channel, means in said selection circuit responsive to pulses of signals respectively opposite to those of said combined pulses of a group for selecting and preparing for connection one of said teletypewriters to said channel in accordance with its particular group of signals incoming over said channel, and means in said code controlled device for producing a special pulse for each signal incoming over said channel for completing the connection of the desired one of said teletypewriters to said channel.

3. In a telegraph system, a transmission channel and a station connected thereto, said station comprising a plurality of teletypewriters arranged for connection individually to said channel, means for regenerating and repeating permutation code signals incoming over said channel, means in said regenerating means for producing timing pulses in response to each signal incoming over said channel, a permutation code signal controlled device normally deactivated, a network for each selecting pulse of a permutation code signal incoming over said channel for combining one of said timing pulses with a selecting pulse of a signal from said regenerating means, a selection circuit to which said combined pulses in turn are applied, a plurality of address code signal circuits arranged to receive the permutation code signals in groups from said selection circuit to thereby prepare the respective teletypewriters of said plurality to said channel, means in said selection circuit responsive to one special group only of said combined pulses for activating said code signal controlled device to receive a group of permutation code signals for operating the desired one of said address code signal circuits.

4. In a telegraph system, a transmission channel and a station connected thereto, said station comprising a plurality of teletypewriters arranged for connection individually to said channel, means for regenerating and repeating permutation code signals incoming over said channel, means in said regenerating means for producing timing pulses in response to each signal incoming over said channel, a permutation code signal controlled device, a network for each selecting pulse of a permutation code signal incoming over said channel for combining one of said timing pulses with a selecting pulse of a signal from said regenerating means, a selection circuit to which said combined pulses are applied in a sequential order, a plurality of address code circuits arranged to receive the permutation code signals in groups from said selection circuit to thereby prepare the respective teletypewriters of said plurality for connection to said channel, means in said selection circuit responsive to two special groups only of combined pulses for activating said code controlled device to receive a group of permutation code signals for operating the desired one of said address code signal circuits, and other means in said selection circuit responsive to still another special group of said combined pulses when said permutation code signal controlled device is in an activated condition for preparing said device to become deactivated, and means independent of said network and said selection circuit but responsive to a special pulse produced at the end of said other special group of combined pulses for completing the deactivation of said device.

5. In a telegraph system, a transmission channel and a station connected thereto, said station comprising a plurality of teletypewriters arranged for connection individually to said channel, means for regenerating and repeating permutation code signals incoming over said channel, means in said regenerating means for producing timing pulses in response to each signal incoming over said channel, a permutation code signal controlled device, a network for each selecting pulse of a permutation code signal for combining one of said timing pulses with a selecting pulse of a signal from said regenerating means, a selection circuit to which said combined pulses are applied in a sequential order, a plurality of address code circuits arranged to receive the permutation code signals in groups from said selection circuit to thereby prepare the respective teletypewriters of said plurality for connection to said channel, and connection means including an electronic component of each of said address code circuits operable in response to one or more signals other than the proper signal for preventing the desired address code circuit from operating in response to an improper signal.

6. In a telegraph system, a transmission channel and a plurality of stations connected thereto, each of said stations comprising a plurality of teletypewriters arranged for connection individually to said channel, means for regenerating and repeating permutation code signals incoming over said channel and for producing timing pulses in response to each signal incoming over said channel, a permutation code signal controlled device normally deactivated, a network for each selecting pulse of a permutation code signal incoming over said channel for combining one of said timing pulses with a selecting pulse of a signal from said regenerating means, a selection circuit to which said combined pulses, in turn, are applied, a plurality of address code circuits arranged to receive the permutation code signals in groups from said selection circuit to thereby prepare the proper teletypewriter of said plurality for connection to said channel, means in said selection circuit responsive to two groups only of combined pulses for activating said permutation code signal controlled device to receive groups of signals constituting the address code of the desired teletypewriter, means in one or more of said address code circuits at each of two or more of said stations responsive to two special groups only of combined pulses received from their respectively associated selection circuits to thereby simultaneously prepare a teletypewriter at each of said two or more stations for connection to said channel, and means in said permutation code signal controlled device at each of said two or more stations for producing a special pulse in response to one of the two permutation code signals included in said two special groups of combined pulses for simultaneously completing the connection of said teletypewriter at each of said two or more stations to said channel.

7. In a telegraph system, a transmission channel and a plurality of stations connected thereto, each of said stations comprising a plurality of teletypewriters arranged for connection individually to said channel, means for regenerating and repeating permutation code signals incoming over said channel and for producing timing pulses in response to each signal incoming over said channel, a permutation code signal controlled device normally deactivated, a network for each selecting pulse of a permutation code signal incoming over said channel for combining each of said timing pulses with a selecting pulse of a signal from said regenerating means, a selection circuit to which said combined pulses, in turn, are applied, a plurality of address code circuits arranged to receive the permutation code signals in groups from said selection circuit to thereby prepare the proper teletypewriter of said plurality at each station for connection to said channel, means at one station only responsive to a group of address code signals for each of the teletypewriters at any of the other of said stations for preparing a teletypewriter at said one station to receive the message in the event that the signals of the address code for the teletypewriter at the other of said stations are garbled during transmission, and means in said permutation code signal controlled device at said one station for producing a special pulse for each permutation code signal incoming over said channel for completing the connection of the teletypewriter at said one station to said channel.

8. In a telegraph system, a transmission channel and a plurality of stations connected thereto, each of said stations comprising a plurality of teletypewriters arranged for connection individually to said channel, means for regenerating and repeating permutation code signals incoming over said channel and for producing timing pulses in response to each signal incoming over said channel, a permutation code signal controlled device normally deactivated, a network for each selecting pulse of a permutation code signal incoming over said channel for combining each of said timing pulses with a selecting pulse of a signal from said regenerating means, a selection circuit to which said combined pulses, in turn, are applied, a plurality of address code circuits arranged to receive the permutation code signals in groups from said selection circuit to thereby prepare the proper teletypewriter of said plurality for connection to said channel, means at one station only responsive to the address code signals of each of the teletypewriters at any of the other of said stations for preparing a teletypewriter at said one station to receive the message in the event that the signals of the address code for the teletypewriter at the other of said stations are garbled during transmission, means in said permutation code signal controlled device at said one station for producing a special pulse for each permutation code signal incoming over said channel for completing the connection of the teletypewriter at said one station to said channel, and other means in said permutation code signal controlled device at said one station responsive to the special pulse produced by each permutation code signal incoming over said channel for furnishing an alarm to indicate that a message with a garbled address code is about to be received by the teletypewriter assigned to receive such messages at said one station.

9. In a signal responsive selector mechanism, first electron discharge means for registering the selective attributes of each of the selecting pulses of received code combinations of signals, sets of gaseous discharge devices so connected to said electron discharge means as to have at least one of the gaseous devices in any set operated upon response of said electron discharge means to any code combination except one, and whereof said excepted code combination is different for each set of gaseous discharge devices, second electron discharge means controllable by said sets of gaseous discharge devices and operable upon the operation of any of the gaseous discharge devices in a set, means for generating a switching control pulse after each received code combination of signals, and electrical circuit switching means individual to said second electron discharge means and operable by said pulse generating means unless its associated second electron discharge means is operated.

10. In a signal responsive selector mechanism, electron discharge means for registering the selective attributes of each of the selecting pulses of received code combinations of signals, sets of gaseous discharge devices so connected to said electron discharge means as to have at least one of the gaseous discharge devices in any set operated upon response of said electron discharge means to any code combination except one, and whereof said excepted code combination varies from one to another of said sets of gaseous discharge devices, an instrumentality normally connected to one of said sets of gaseous discharge devices for detecting the operation of any of the gaseous devices of that set, and means operable following reception of the one code combination in response to which none of the gaseous devices of said one set operates for associating said detecting instrumentality with another of said sets of gaseous discharge devices.

11. In a signal responsive selector mechanism, electron discharge means for registering the selective attributes of each of the selecting pulses of received code combinations of signals, sets of gaseous discharge devices so connected to said electron discharge means as to have at least one of the gaseous discharge devices in any set operated upon response of said electron discharge means to any code combination except one, and whereof said excepted code combination varies with different sets of said gaseous discharge devices, an instrumentality normally connected to each of certain of said sets of gaseous discharge devices for detecting the operation of any of the gaseous discharge devices of the associated set, and means operable following reception of a code combination in response to which none of the gaseous discharge devices of one or more of said sets operates for associating the unoperated detecting instrumentalities with others of said sets of gaseous discharge devices.

12. In a signal responsive selector mechanism, a plurality of sets of electron discharge devices conditioned to have at least one of the gaseous discharge devices in any set rendered conductive in response to any received code combination of signals except one, whereof said excepted code combination varies with different sets of said gaseous discharge devices, a plurality of instrumentalities normally associated with certain of said sets of gaseous discharge devices for detecting the operation of one or more of the gaseous discharge devices of said certain sets, means operable following reception of a code combination in response to which none of the gaseous discharge devices of one or more of said sets operates for respectively associating with others of said sets the unoperated detecting instrumentalities normally associated with said one or more sets, and function executing means operable incident to reception of the next code combination provided that in response thereto none of the gaseous discharge devices of one of said other sets operates and the associated detecting instrumentality accordingly remains unoperated.

13. In a signal responsive selector mechanism, a plurality of sets of gaseous discharge devices conditioned to have at least one of the gaseous discharge devices in any set rendered conductive in response to any received code combination of signals except one, whereof said excepted code combination varies with different sets of said gaseous discharge devices, a plurality of function executing instrumentalities all tending to operate incident to each received code combination of signals, and means individual to said instrumentalities and operable by one or more of said sets of gaseous discharge devices upon operation of any of the gaseous devices thereof for precluding operation of the associated function executing instrumentality.

14. In a communication system, a transmission channel and a station connected thereto, said station comprising a signal code controlled device including a plurality of paths individually representing signal code combinations, operable means in said code controlled device normally associated with one of said paths and thereby rendered effectively responsive to any except the signal represented by said one path, other operable means respectively associated with the first-mentioned operable means and operable only under the condition of said first-mentioned operable means being in unoperated condition for transferring said first-mentioned operable means to another of said paths, and means responsive to operation of said first-mentioned operable means over said other path for restoring to unoperated condition said second-mentioned operable means.

15. In a telegraph system, a transmission channel and a station connected thereto, said station comprising a signal code controlled device including a plurality of paths individually representing signal code combinations, space discharge means in said code controlled device normally associated with one of said paths and thereby rendered effectively responsive to all signal code combinations except the one represented by said one path, relay means respectively associated with said space discharge means and operable only under the condition of the respectively associated space discharge means being in unoperated condition for transferring said space discharge means to another of said paths, and means responsive to operation of said space discharge means over said other path for releasing said relay means.

16. In a selector system, a signal receiving mechanism, space discharge means for decoding signal code combinations received by said signal receiving means and for selectively conditioning any one of a plurality of paths according to the received signal, a plurality of selection combining circuits each terminating two of said paths and normally qualified to respond only to the conditioning of a particular one of said two paths, means in said combining circuits responsive to the conditioning of one of said paths for rendering them responsive to the conditioning of the other of siad two paths, and a switching instrumentality individual to each of said combining circuits and operable thereby upon response thereof to the conditioning of said other path.

References Cited in the file of this patent

UNITED STATES PATENTS

| | | |
|---|---|---|
| 2,139,079 | Haselton | Dec. 6, 1938 |
| 2,300,003 | Neiswinter | Oct. 27, 1942 |
| 2,300,505 | Hubbard | Nov. 3, 1942 |
| 2,342,886 | Murphy | Feb. 29, 1944 |
| 2,570,279 | Ridler et al | Oct. 9, 1951 |
| 2,586,130 | Potter | Mar. 11, 1952 |
| 2,608,615 | Oberman | Aug. 26, 1952 |